Figure 1:
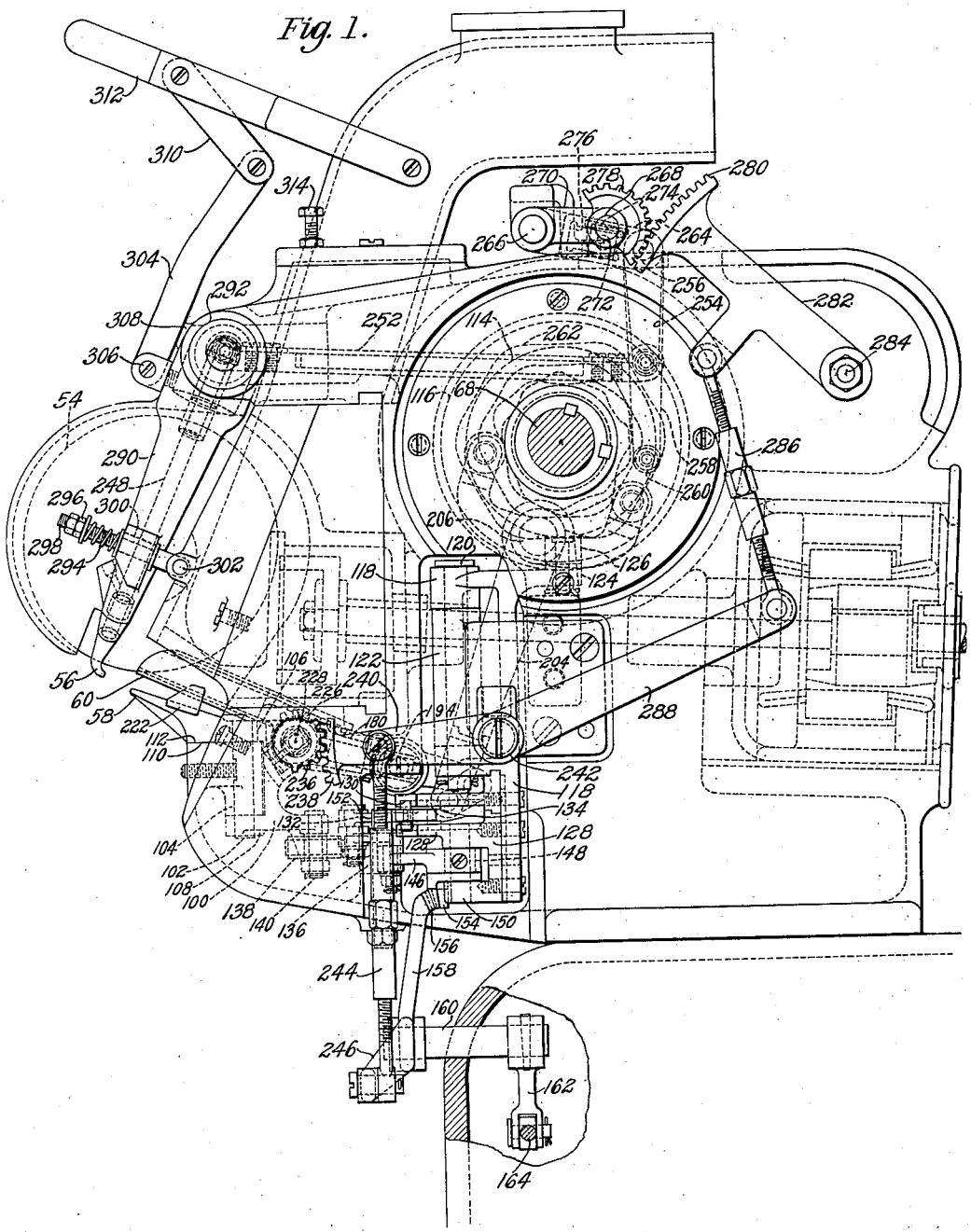

March 5, 1935. G. P. S. CROSS 1,993,597
MACHINE FOR USE IN THE MANUFACTURE OF SHOES
Filed June 29, 1933 25 Sheets-Sheet 3

Witness
Frank A. Wright

Inventor
Garrett P. S. Cross
by Fish Hildreth
Cary & Jenney Attys.

March 5, 1935. G. P. S. CROSS 1,993,597
MACHINE FOR USE IN THE MANUFACTURE OF SHOES
Filed June 29, 1933 25 Sheets-Sheet 6

Witness
Frank A. Wright

Inventor
Garrett P. S. Cross
by Fish Hildreth
Cary & Jenney Attys.

March 5, 1935.  G. P. S. CROSS  1,993,597
MACHINE FOR USE IN THE MANUFACTURE OF SHOES
Filed June 29, 1933   25 Sheets-Sheet 7
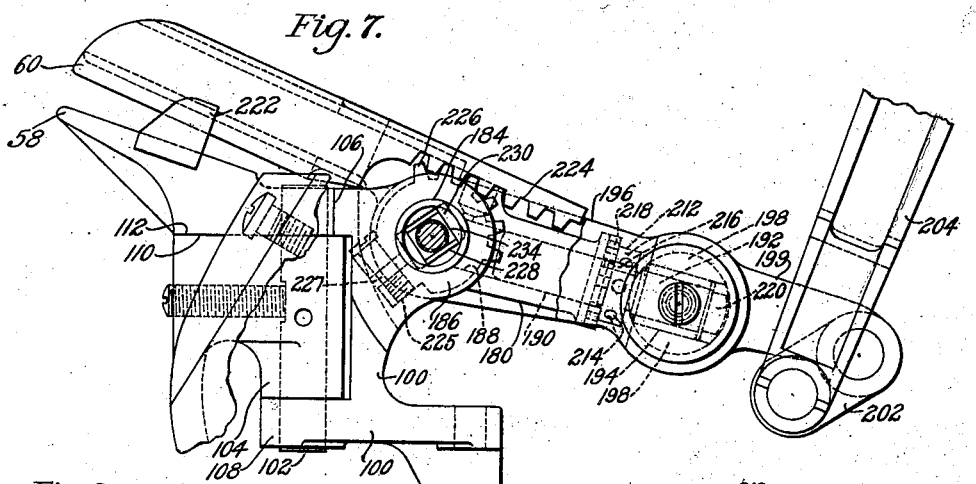
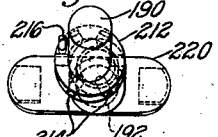
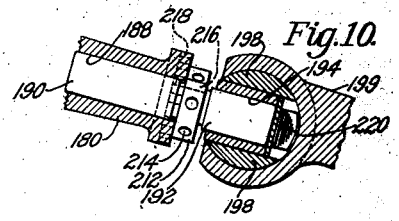
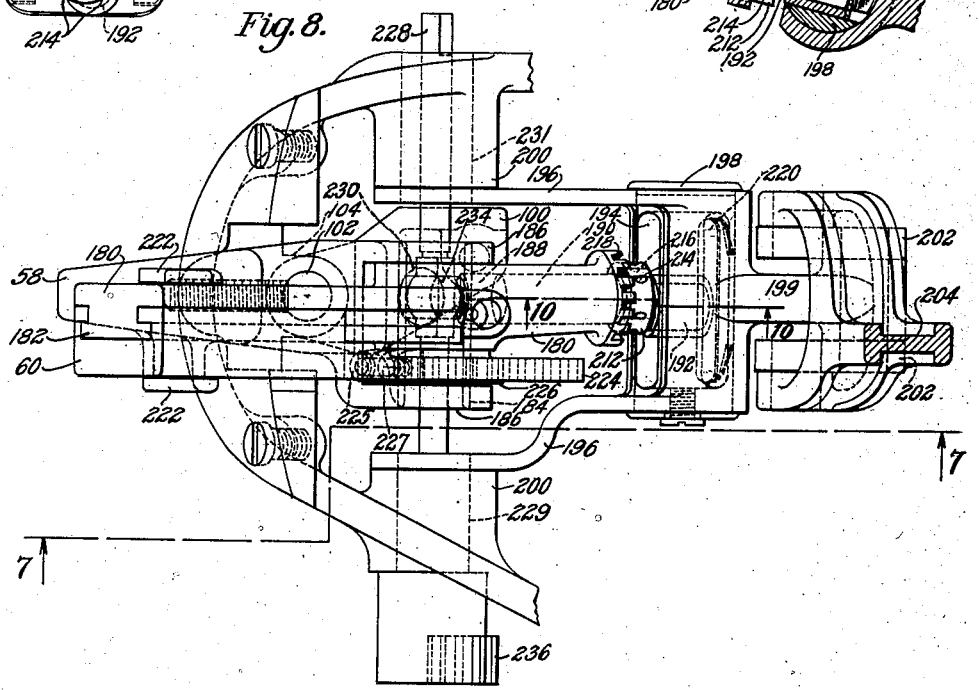

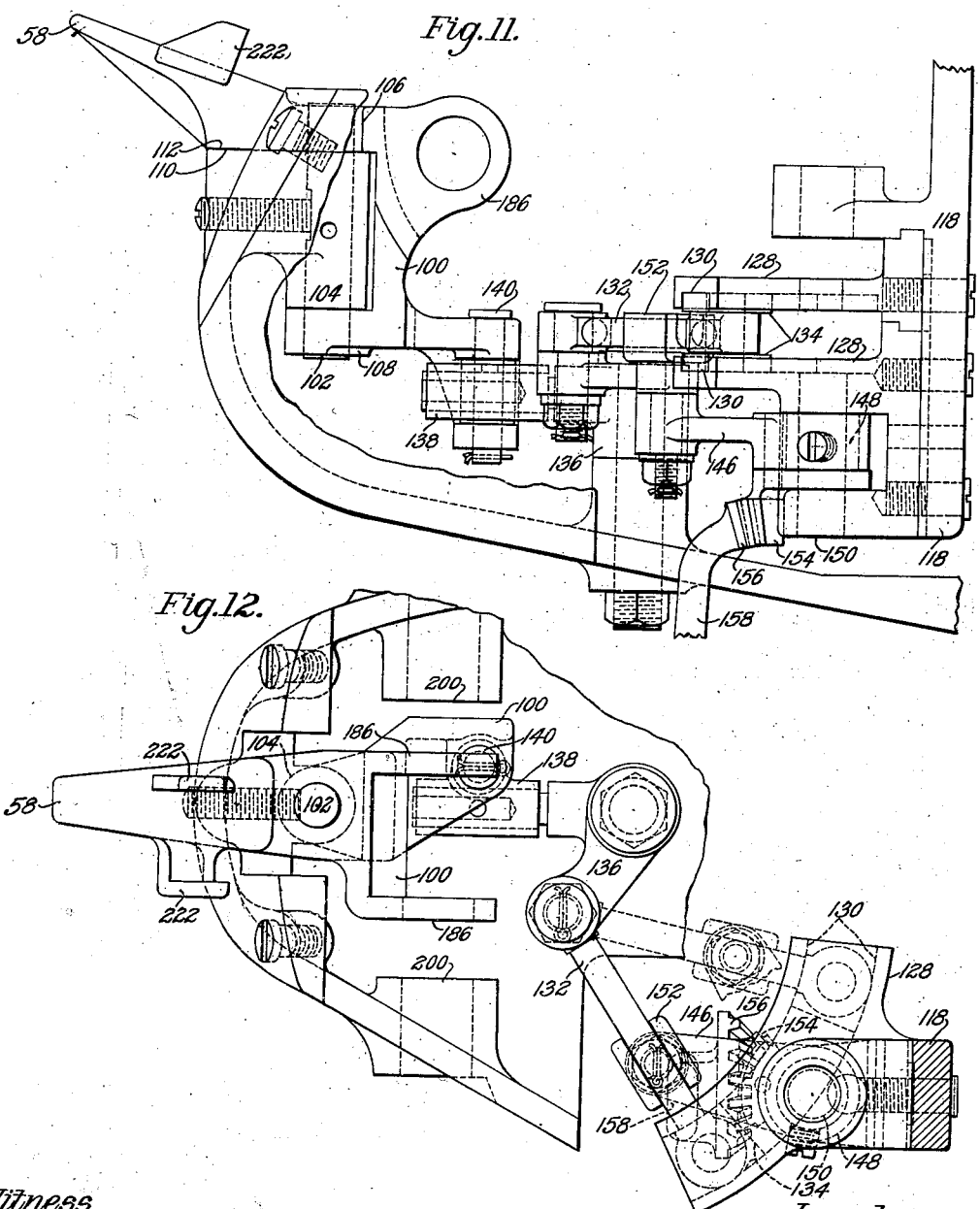

March 5, 1935.　　　G. P. S. CROSS　　　1,993,597
MACHINE FOR USE IN THE MANUFACTURE OF SHOES
Filed June 29, 1933　　25 Sheets-Sheet 9
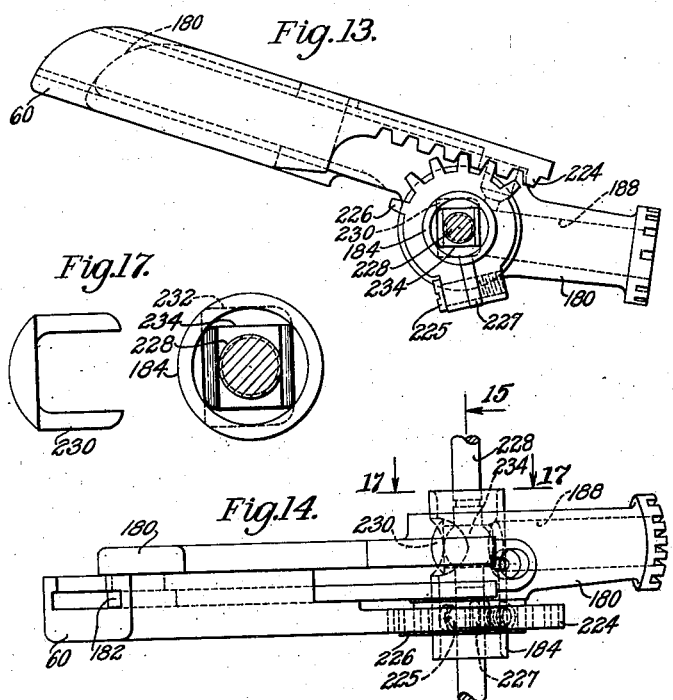
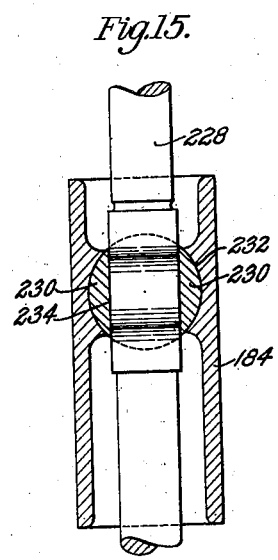
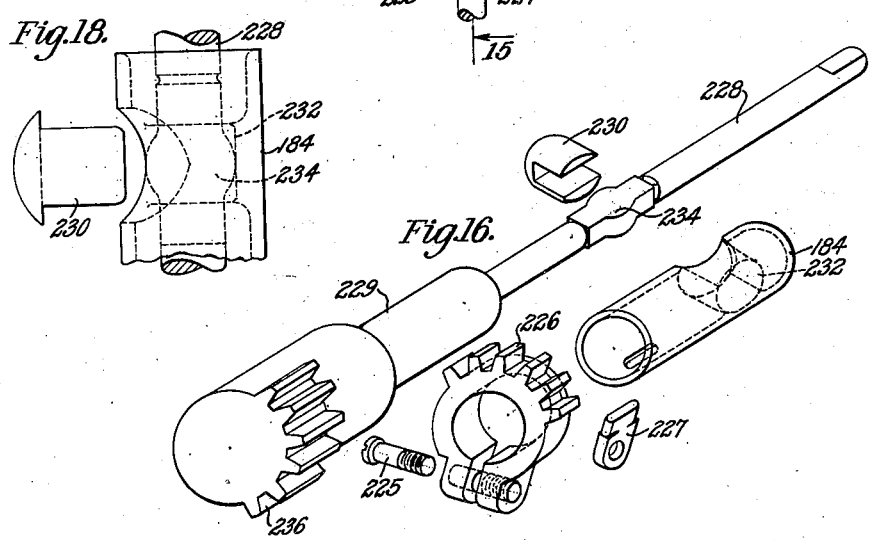

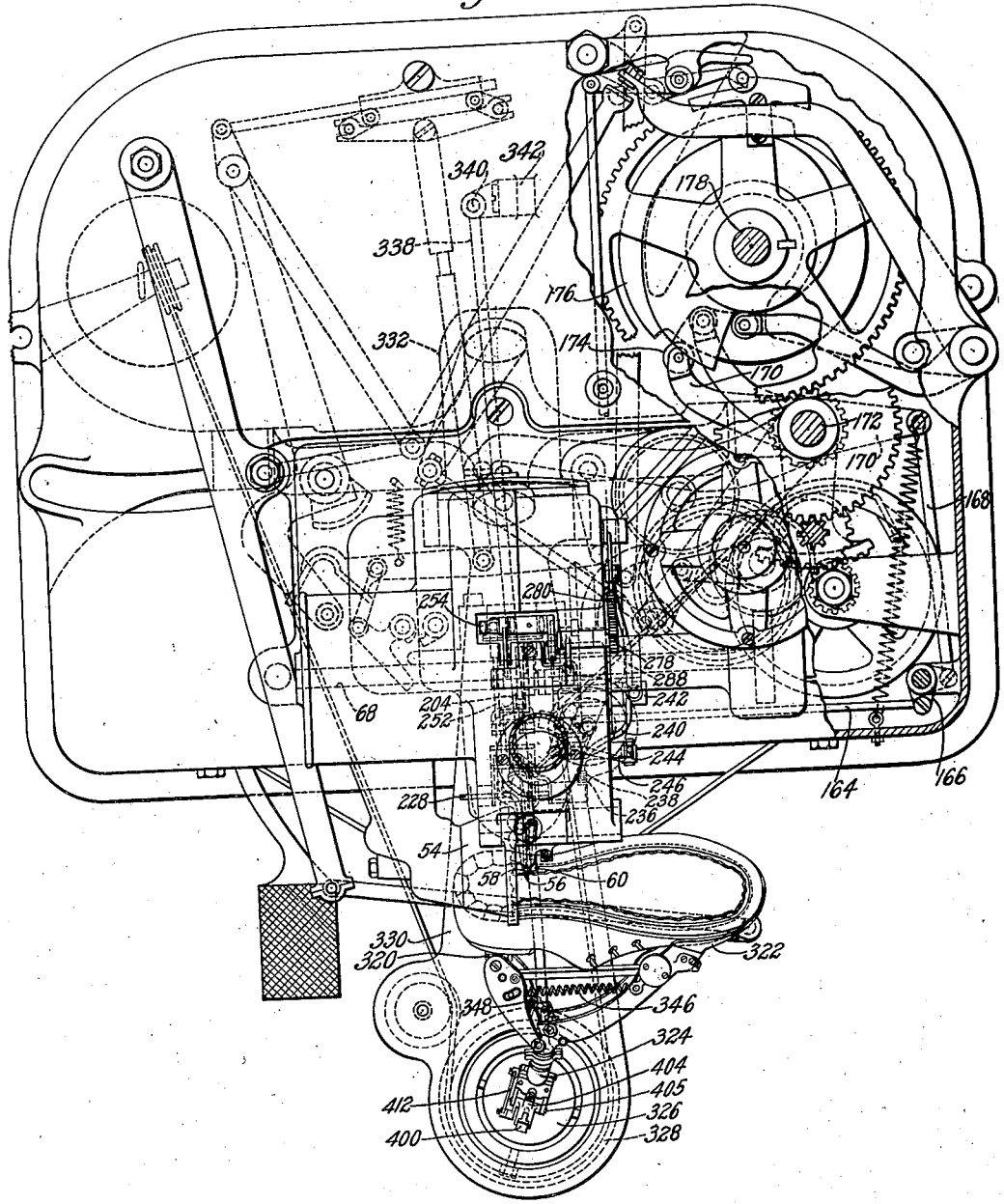

March 5, 1935.  G. P. S. CROSS  1,993,597
MACHINE FOR USE IN THE MANUFACTURE OF SHOES
Filed June 29, 1933  25 Sheets-Sheet 11

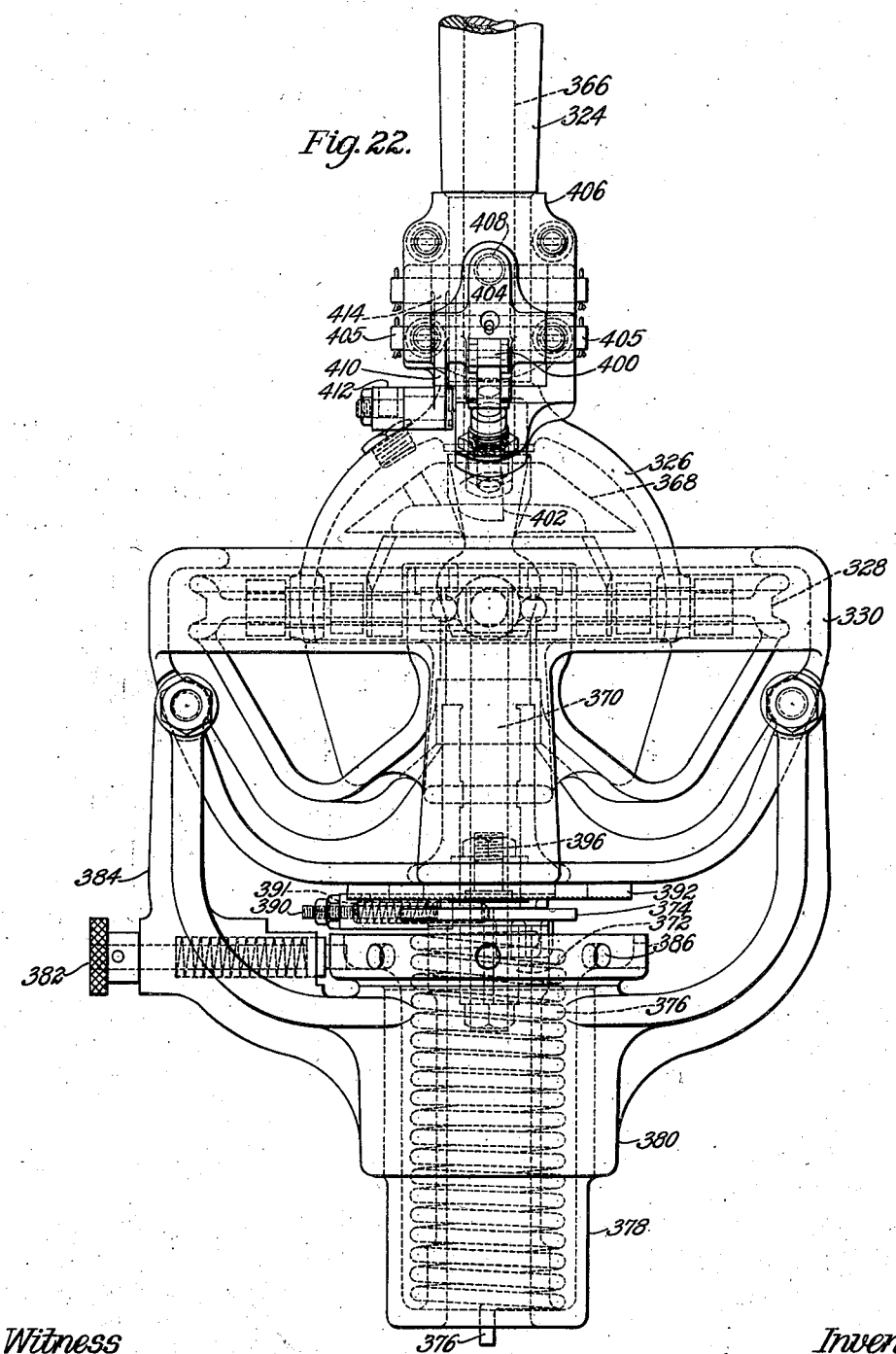

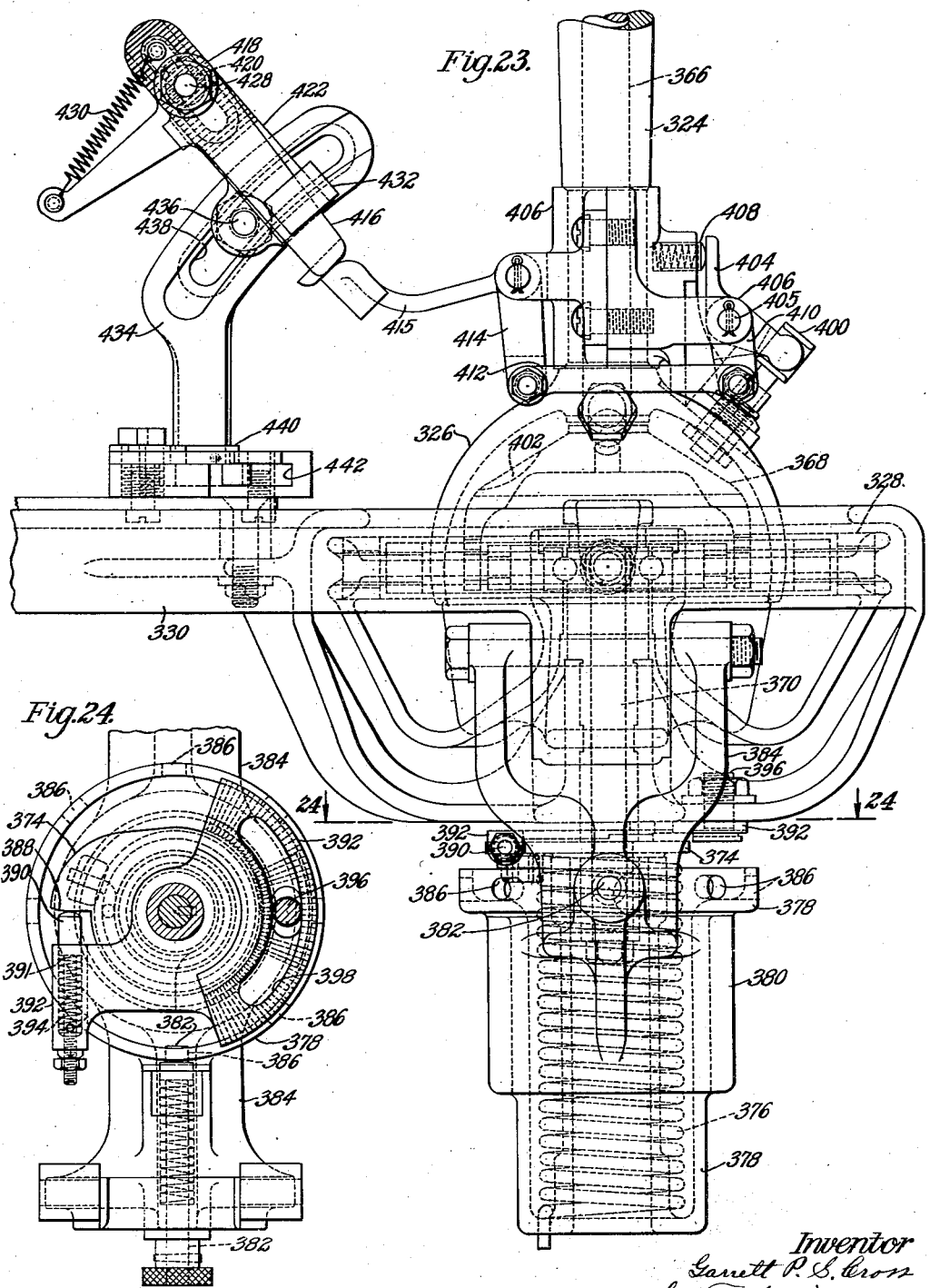

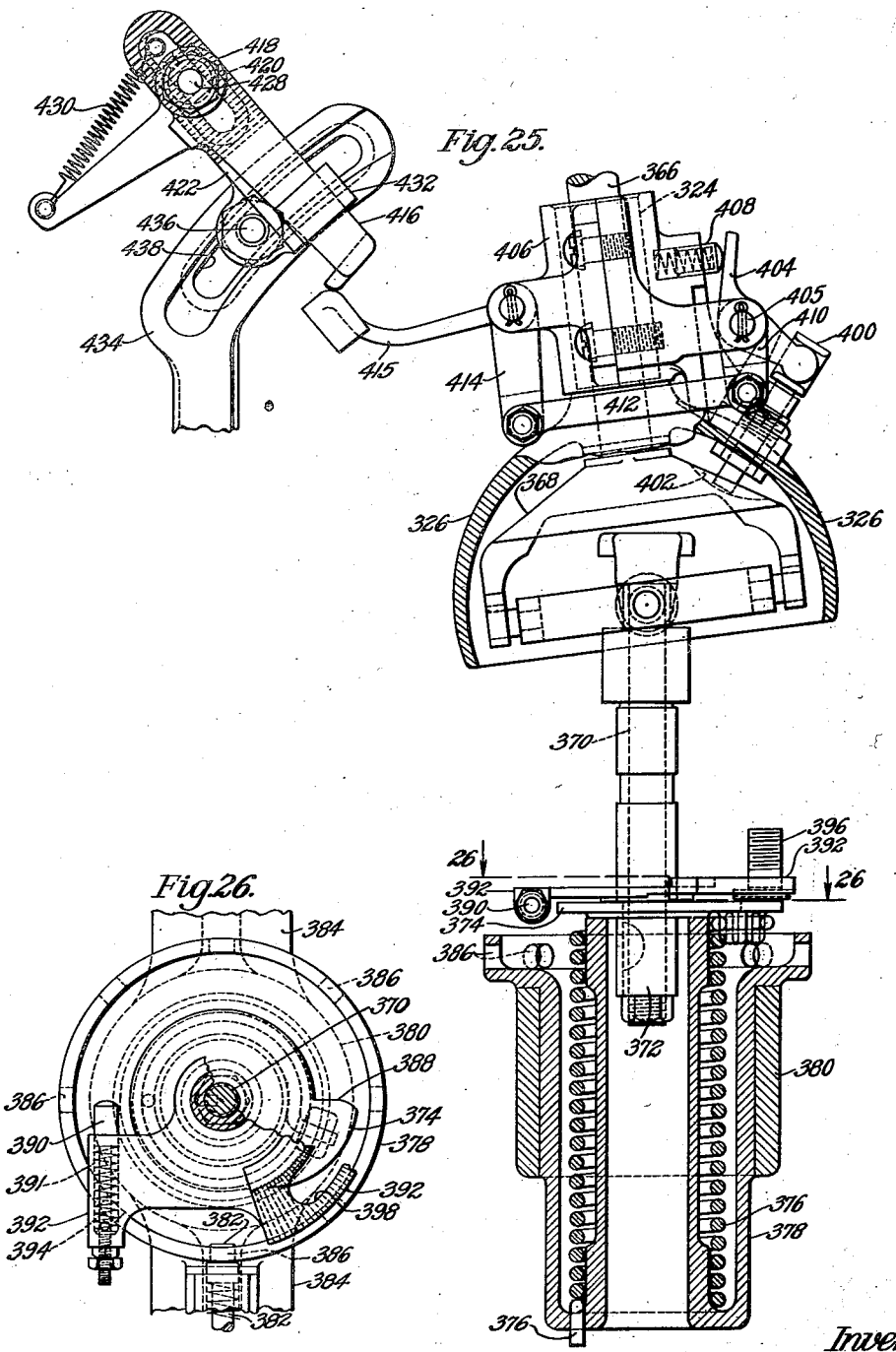

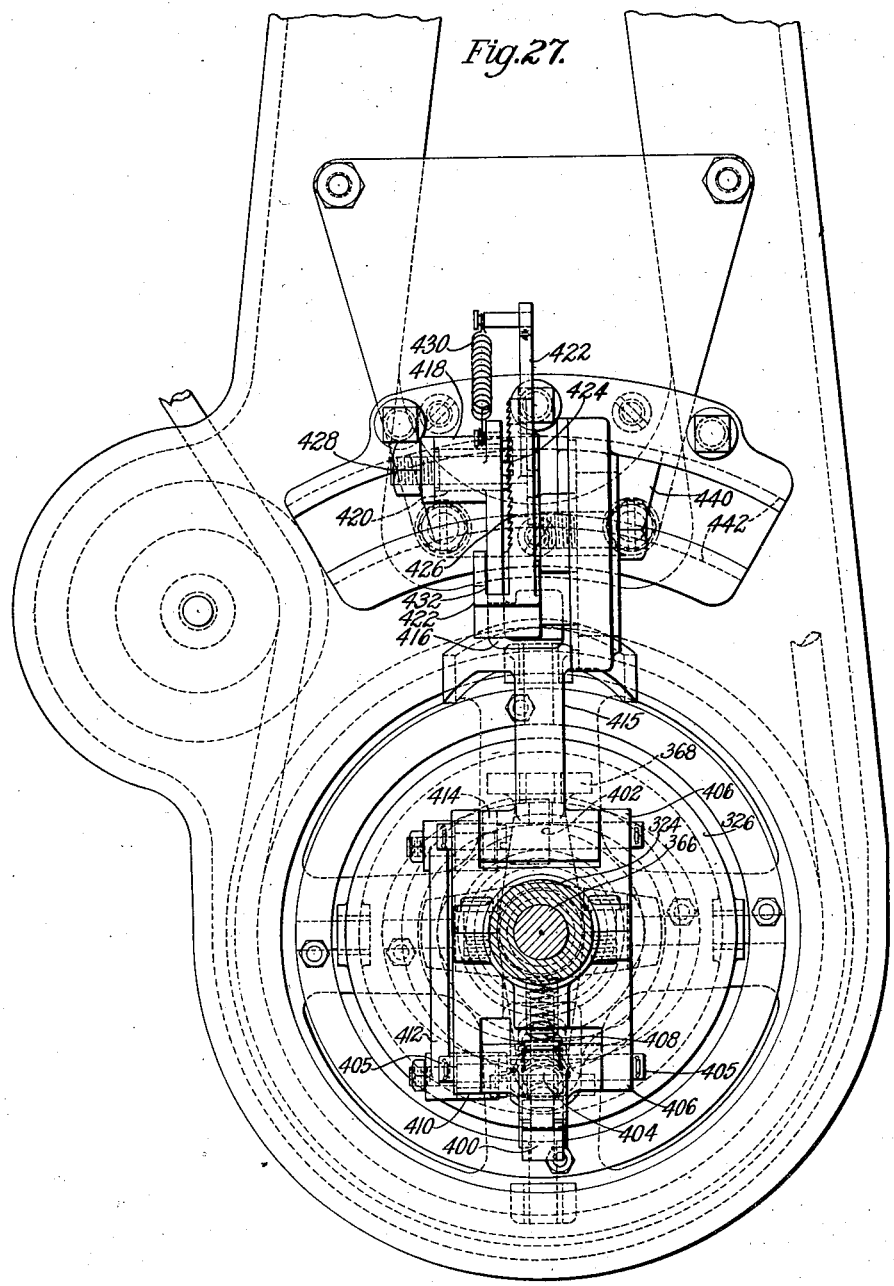

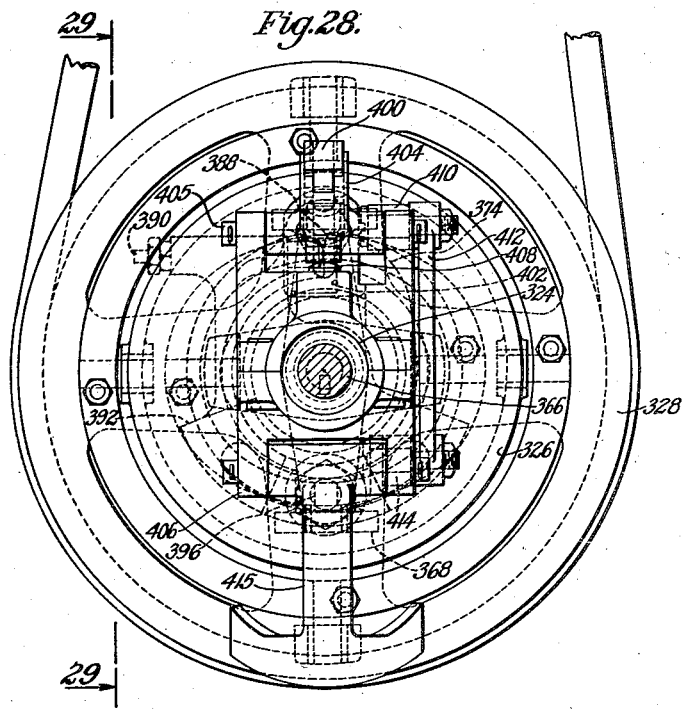
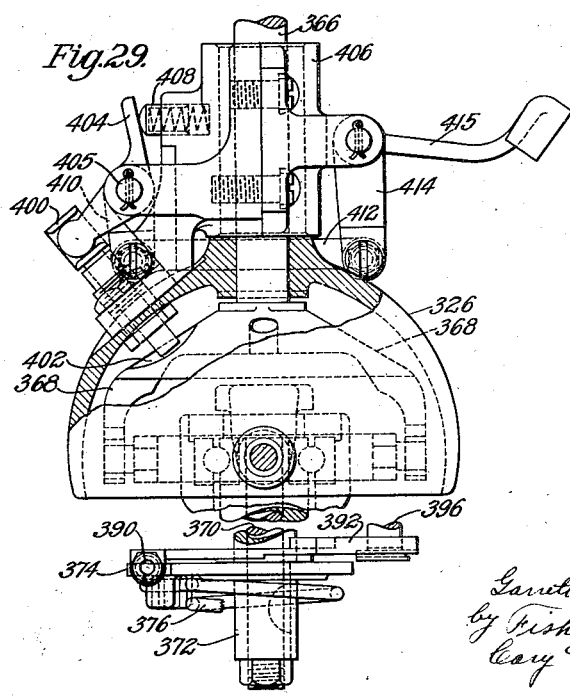

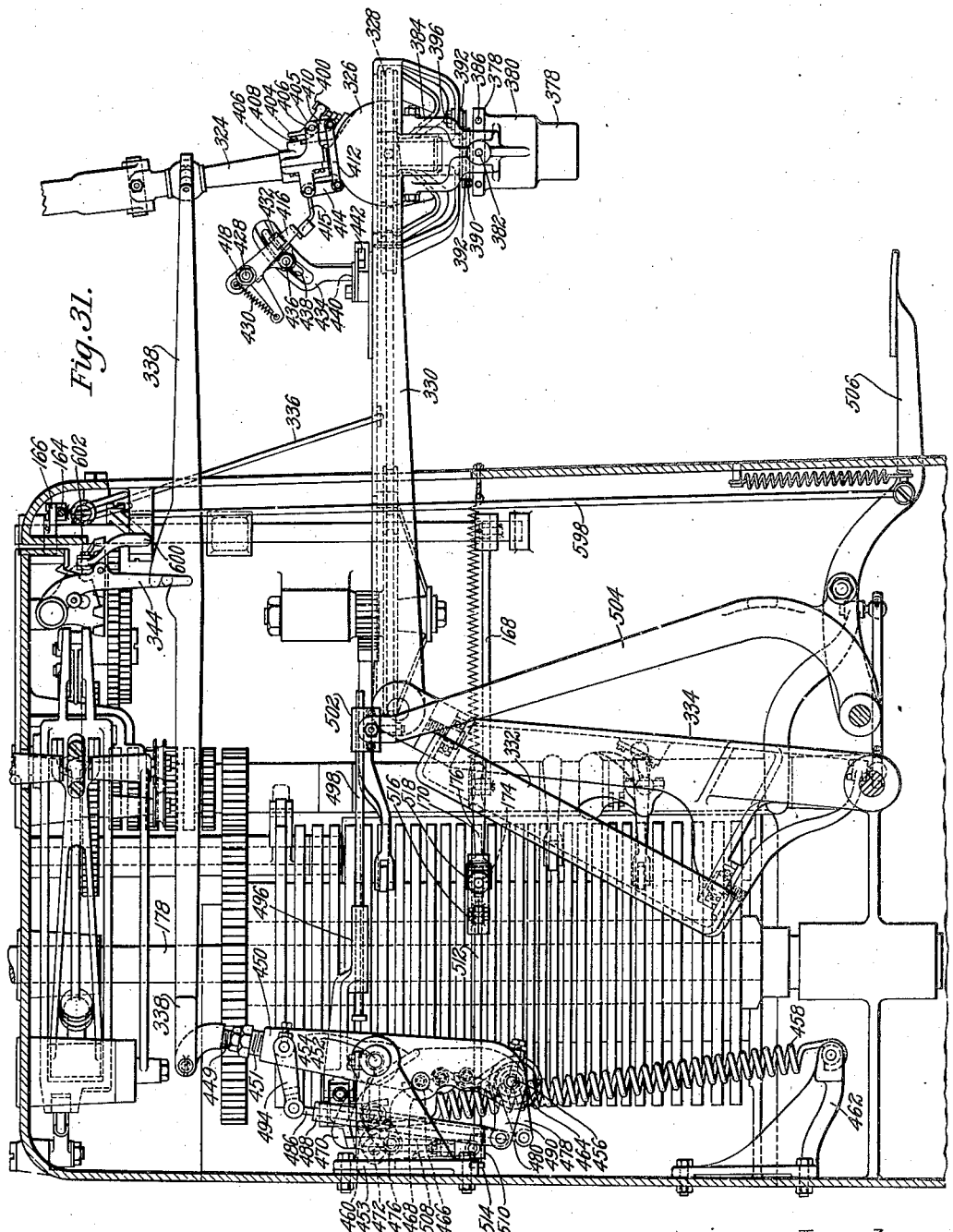

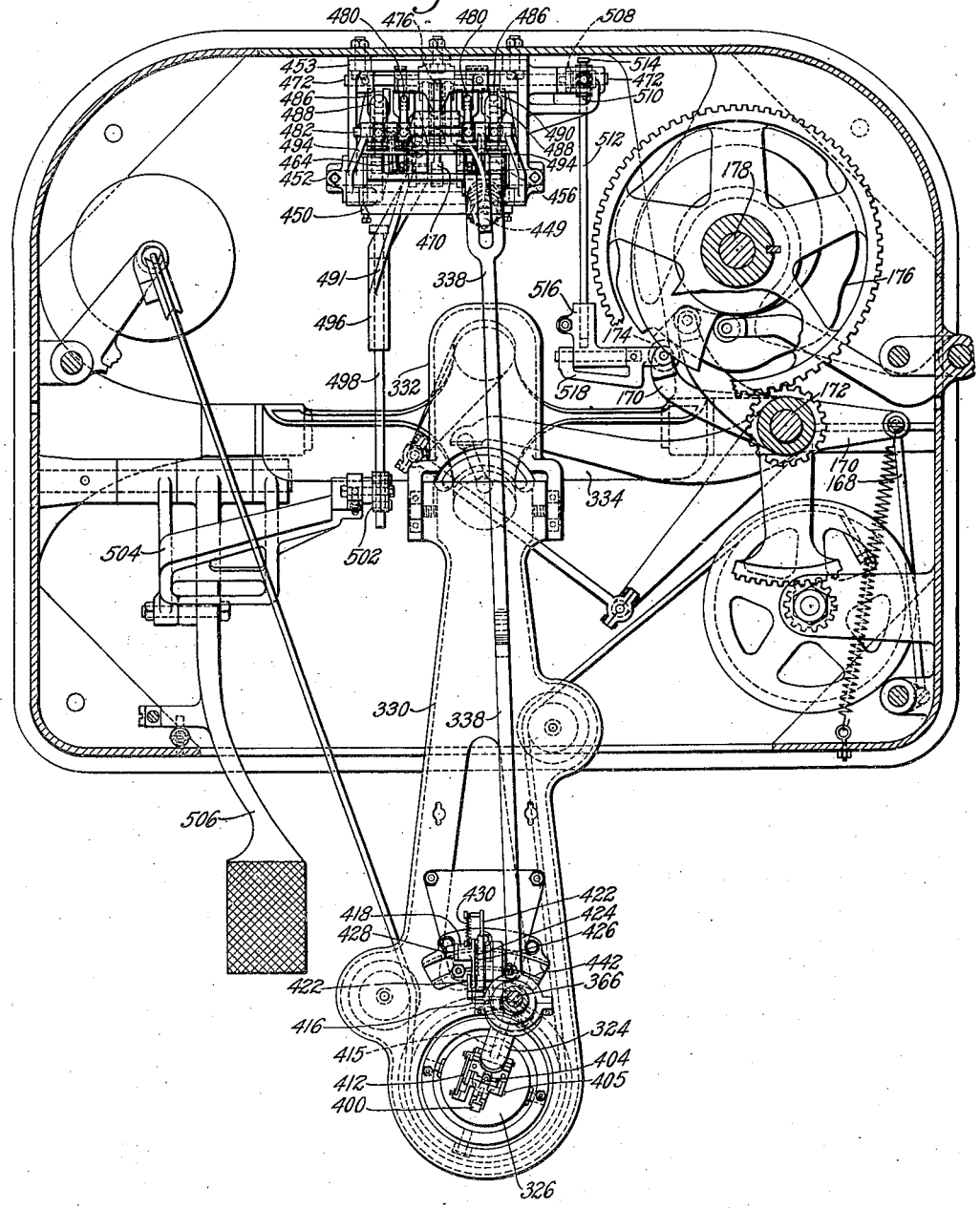

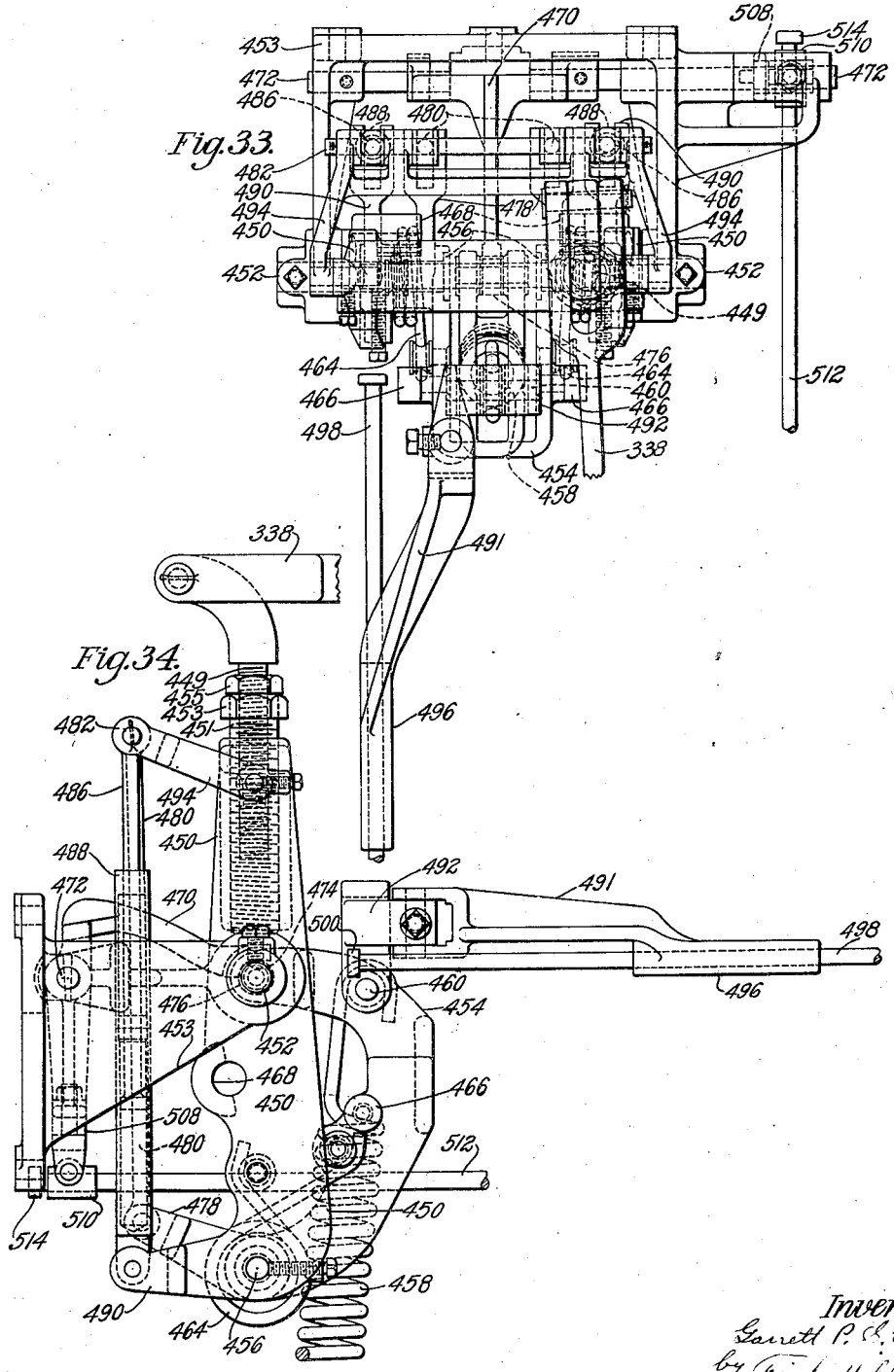

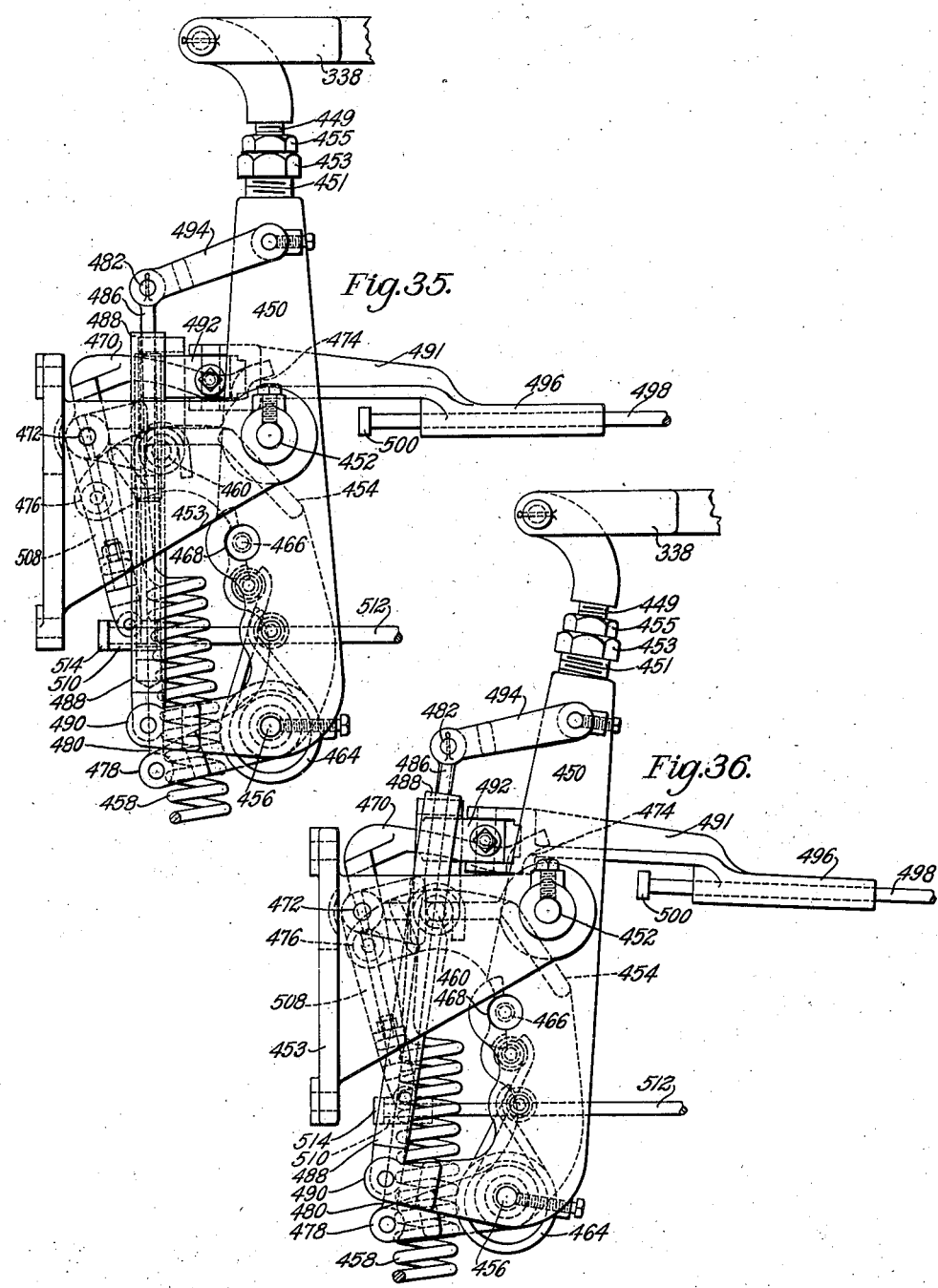

March 5, 1935. G. P. S. CROSS 1,993,597
MACHINE FOR USE IN THE MANUFACTURE OF SHOES
Filed June 29, 1933 25 Sheets-Sheet 22

Witness
Frank A. Wright

Inventor
Garrett P. S. Cross
by Fish Hildreth
Cary & Jenney Attys

March 5, 1935. G. P. S. CROSS 1,993,597
MACHINE FOR USE IN THE MANUFACTURE OF SHOES
Filed June 29, 1933 25 Sheets-Sheet 24

Witness
Frank A. Wright

Inventor
Garrett P. S. Cross
by Fish Hildreth
Cary & Jenney Attys.

Patented Mar. 5, 1935

1,993,597

UNITED STATES PATENT OFFICE 1,993,597

MACHINE FOR USE IN THE MANUFACTURE OF SHOES

Garrett P. S. Cross, North Beverly, Mass., assignor to United Shoe Machinery Corporation, Paterson, N. J., a corporation of New Jersey Application June 29, 1933, Serial No. 678,207

45 Claims. (Cl. 12—17)

The present invention relates to machines for use in the manufacture of shoes, and is herein disclosed as embodied in a machine for trimming the inseam and beating out the welt and thereafter pounding down the inseam of a welt shoe, which machine is provided with a shoe supporting jack and automatic mechanism for imparting positioning and feeding movements to the jack and the shoe supported thereon to transfer the point of operation about the shoe during the performance of the several operations above referred to.

The present machine is of the same general type as the machine disclosed in the patent to Alfred R. Morrill No. 1,689,594 dated October 30, 1928 and is similar in many respects to that disclosed in the patent to Alfred R. Morrill, No. 1,911,283, dated May 30, 1933, in which positioning and feeding movements are imparted to the jack to transfer the point of operation from breast line to breast line around the forepart of the shoe during the operation of trimming the inseam and beating out the welt, and thereafter to transfer the point of operation in a reverse direction back to the starting point during the pounding of the inseam.

It is a principal object of the invention to provide in a machine of this general description, a novel and improved arrangement and mode of operation of the several cooperating mechanisms for controlling and positioning the shoe during the several operations of inseam trimming, welt beating and inseam pounding to secure a more accurate and even feed of the work past the shoe operating devices, and to make the machine more completely automatic in operation.

It is another object of the invention to provide a jack of novel and improved construction and mode of operation which is particularly adapted for use with a machine of this general description, and which cooperates effectively with the shoe operating devices to produce a more efficient and completely automatic machine.

A further object of the invention is to provide a novel construction and mode of operation of the cooperating parts of the machine to cause the shoe to be guided past and positioned with relation to the shoe operating devices during the inseam trimming and welt beating operation by the engagement of a guide with the channel formed between the inseam and the inner sole portion of the shoe.

With these and other objects in view, as may hereinafter appear, a feature of the invention is embodied in a construction comprising an oscillatory crease guide engaging the crease between the upper and welt and a beater member cooperating therewith to impart, during each beating stroke, a feeding movement to the work to cooperate with the feeding movements of the jack during the transfer of the point of operation about the shoe and return.

Another feature of the invention is embodied in a construction comprising an oscillatory channel guide which is arranged to cooperate with the feeding movements of the crease guide and beater member to impart a continuous feeding movement to the work.

Another feature of the invention is embodied in a construction comprising means for varying the extent of the feeding movements of the crease guide, beater member and channel guide in timed relation to corresponding variations in the jack feed to retard the rate of feed around the toe and other sharply curved portions of the sole edge.

Another feature of the invention is embodied in a construction comprising a novel and improved mechanism which is rendered operative as the shoe is moved away from the operating devices at the end of the return operation around the shoe sole to open the jack and release the shoe.

Another feature of the invention is embodied in a construction comprising a control mechanism for the jack which is arranged during a portion of the operation on a margin of the shoe to hold the jack yieldingly inwardly in engagement with one guiding member, and during another portion of the operation about the margin of the shoe to force the shoe yieldingly outwardly into engagement with a second guiding member in contact with another portion of the shoe.

It will be understood that certain features of the invention, while particularly adapted for use in the automatic inseam trimming machine herein described, are not limited thereto, but are equally applicable to inseam trimming machines which are not automatic, and to automatic machines for performing operations other than inseam trimming in the manufacture of shoes.

Figure 2:
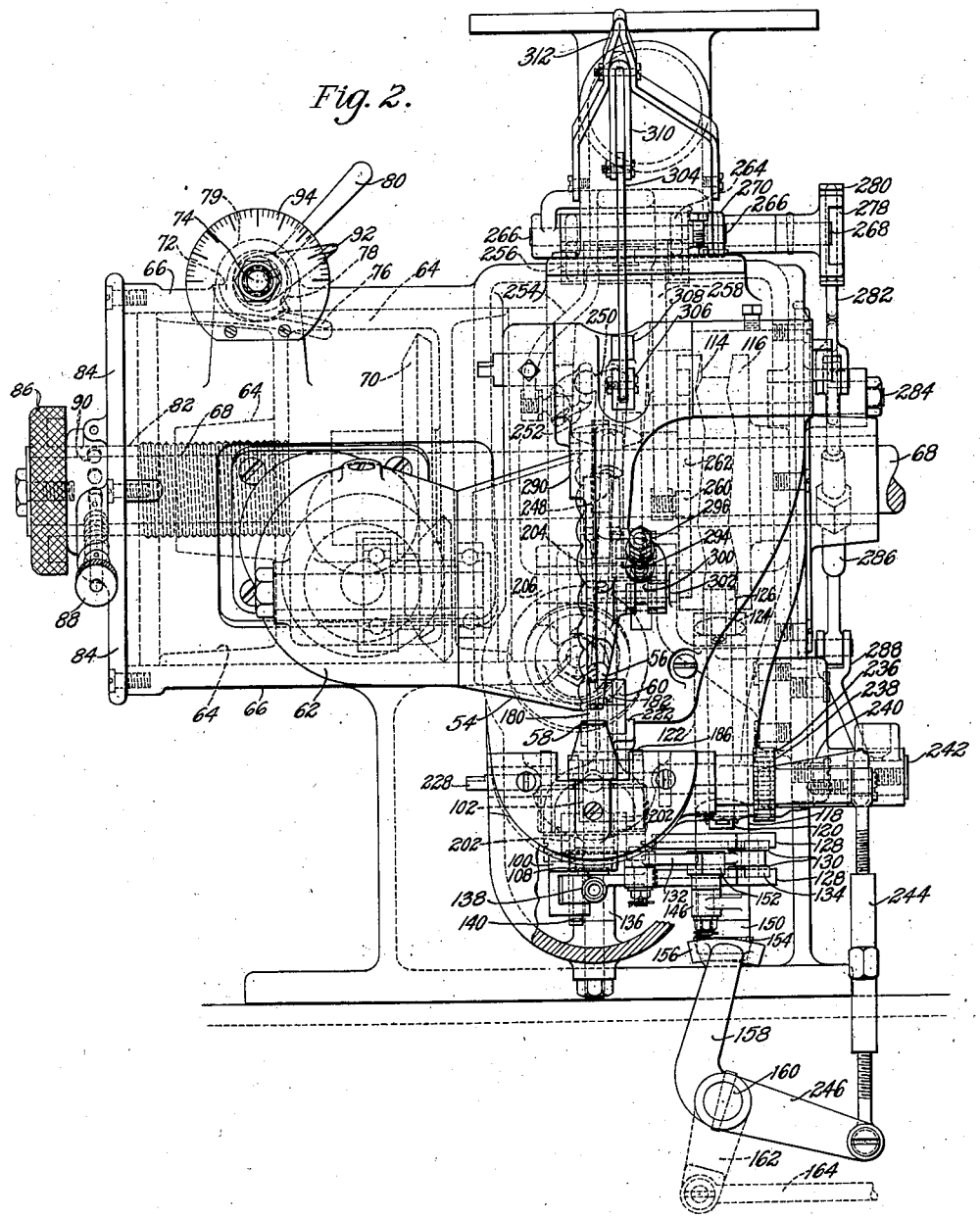
Figure 3:
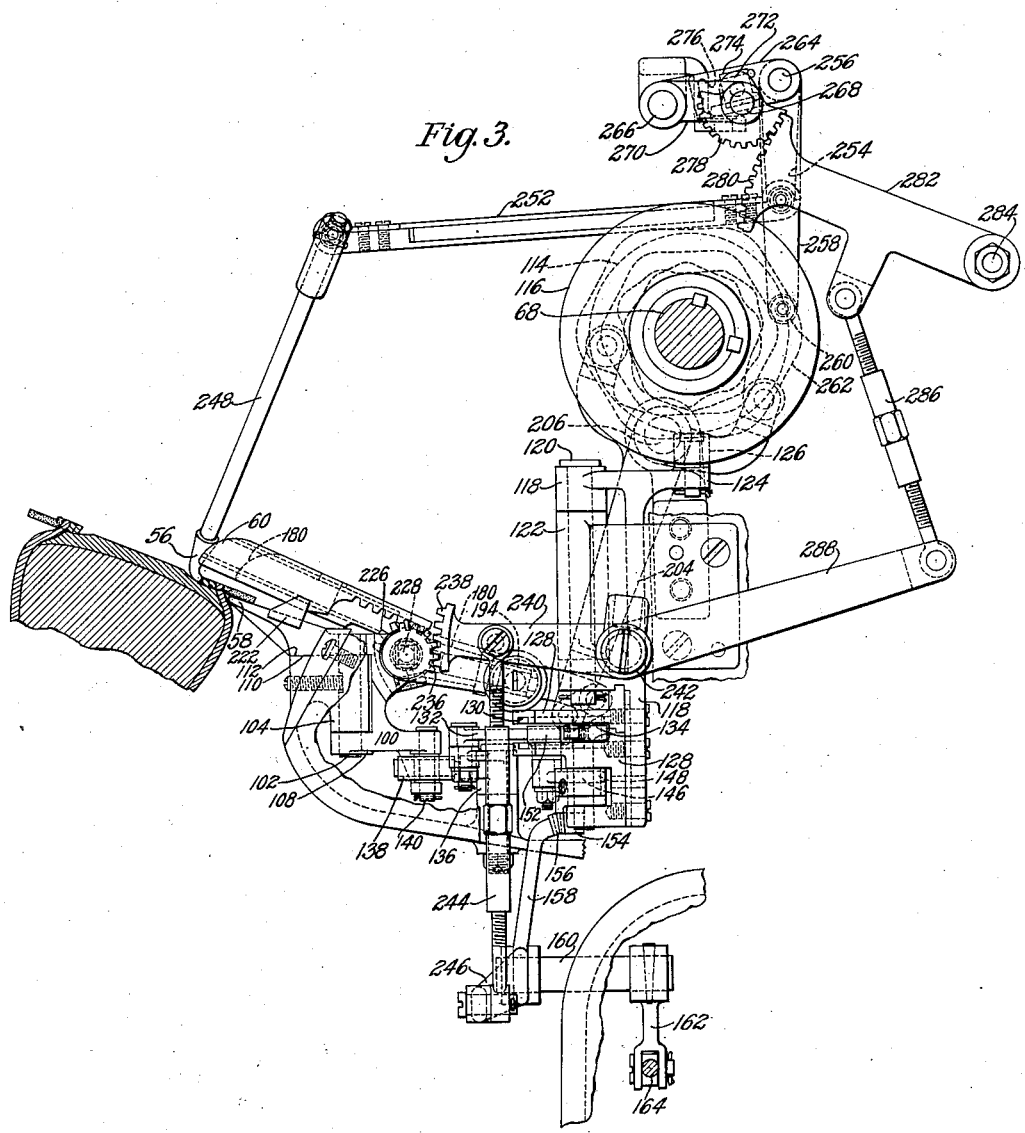
Figure 4:
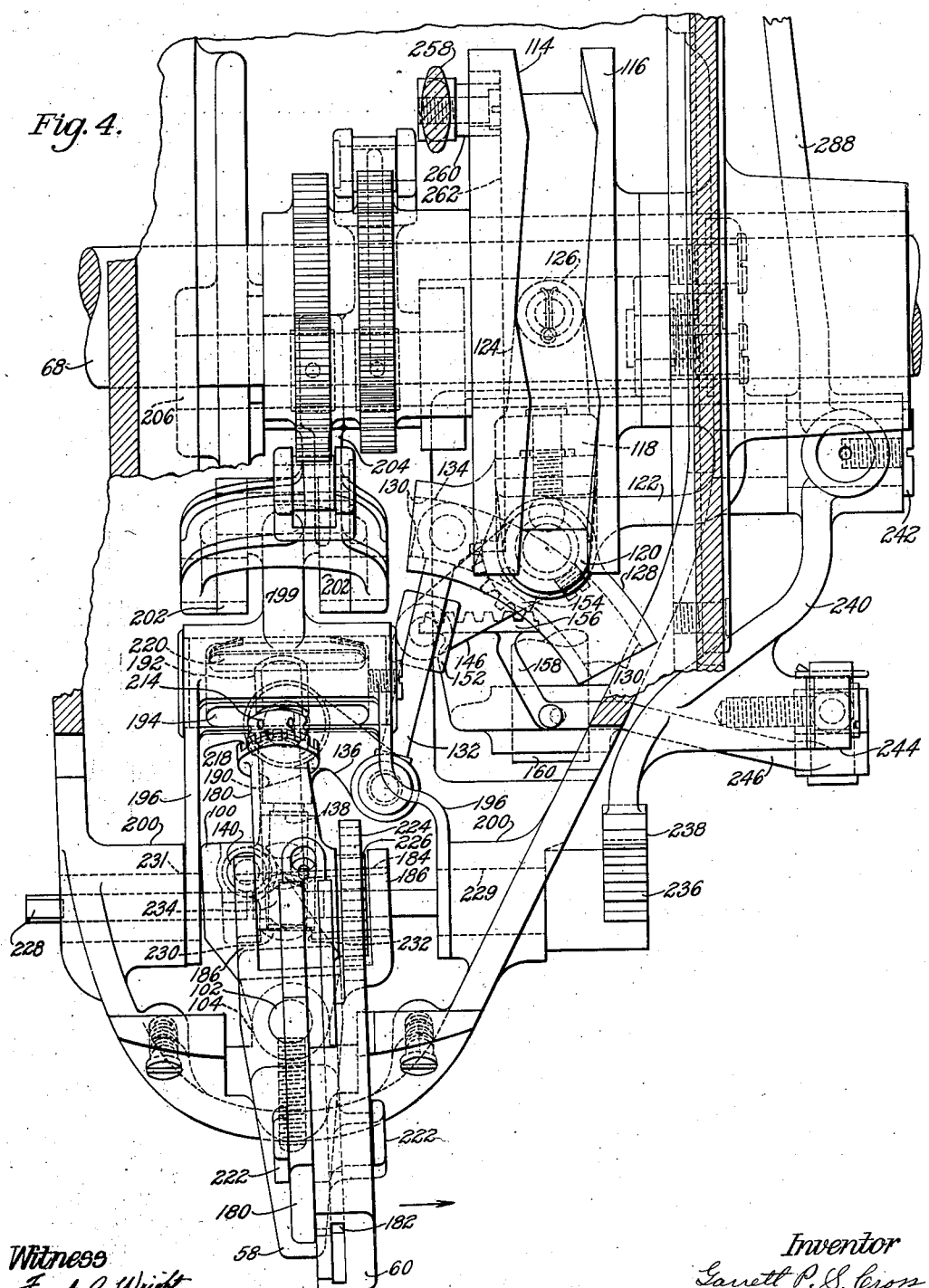
Figure 5:
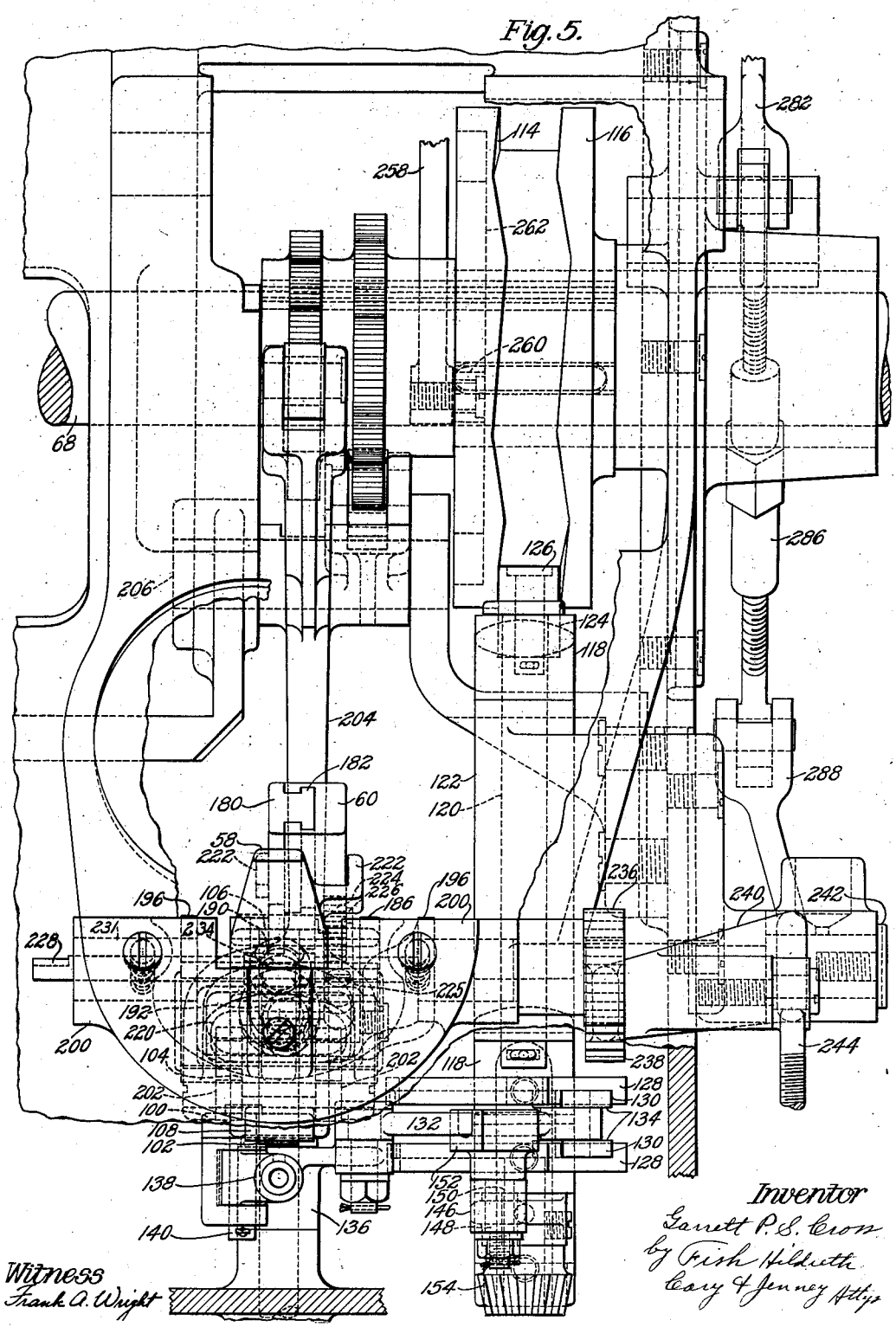
Figure 6:
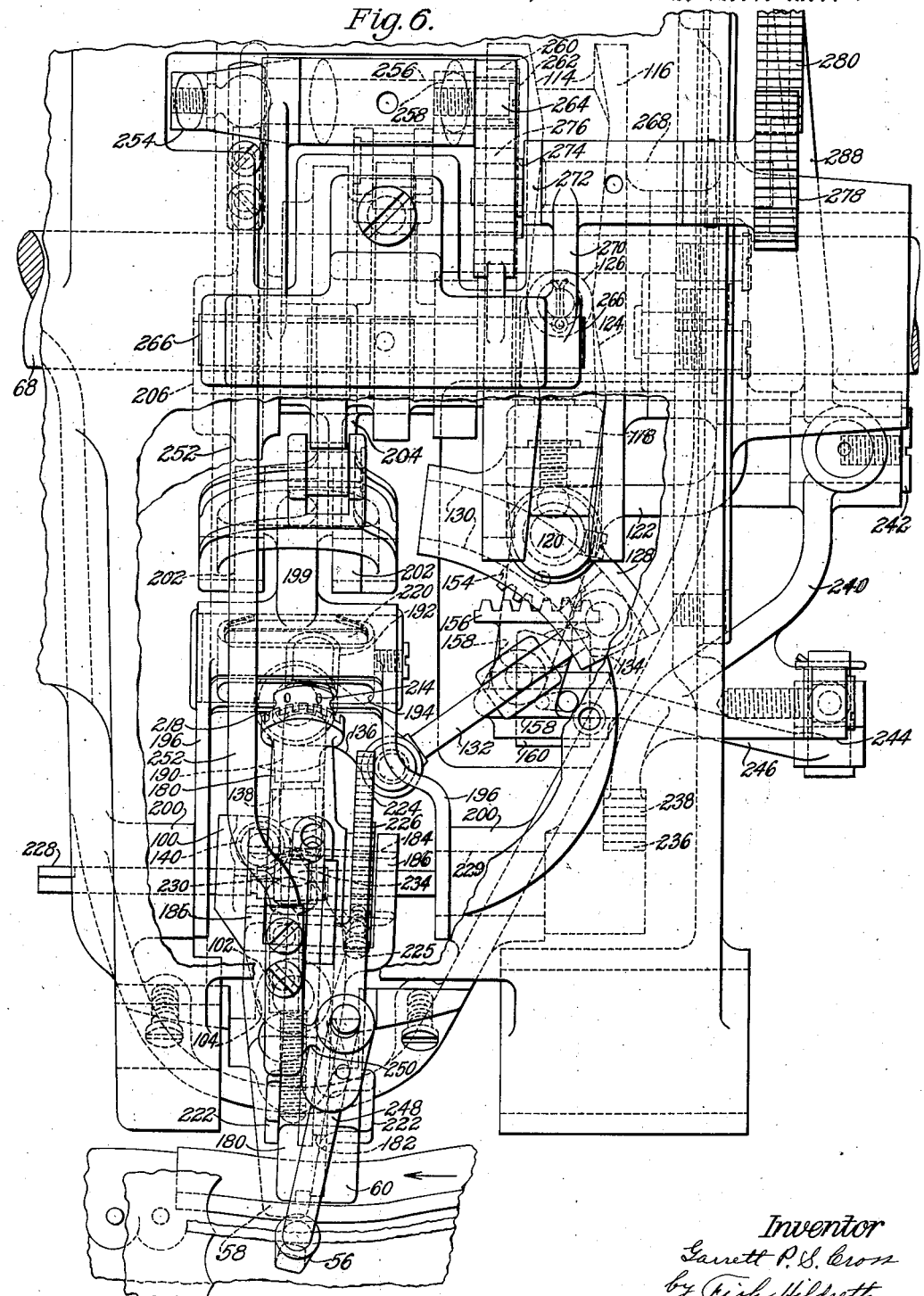
Figure 20:
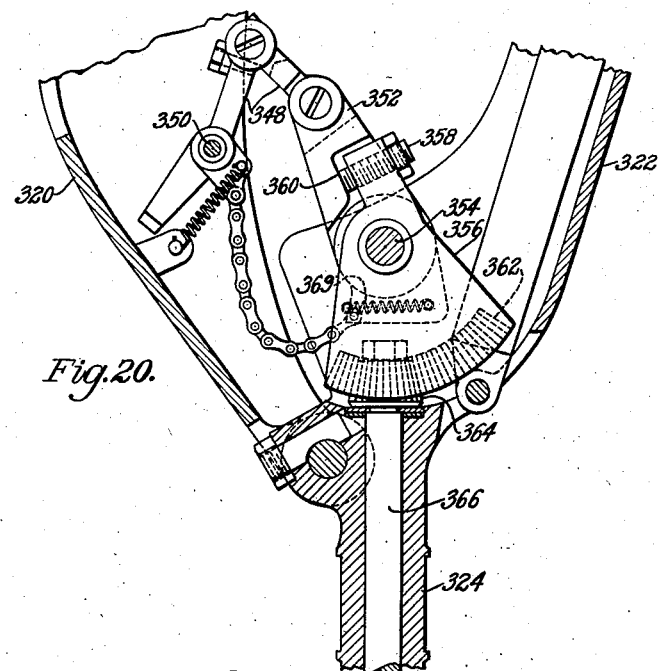
Figure 21:
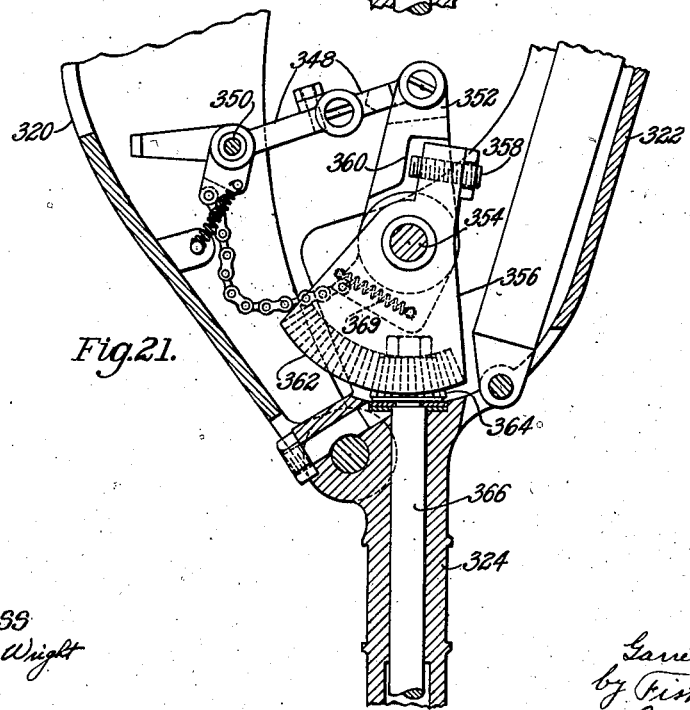
Figure 30:
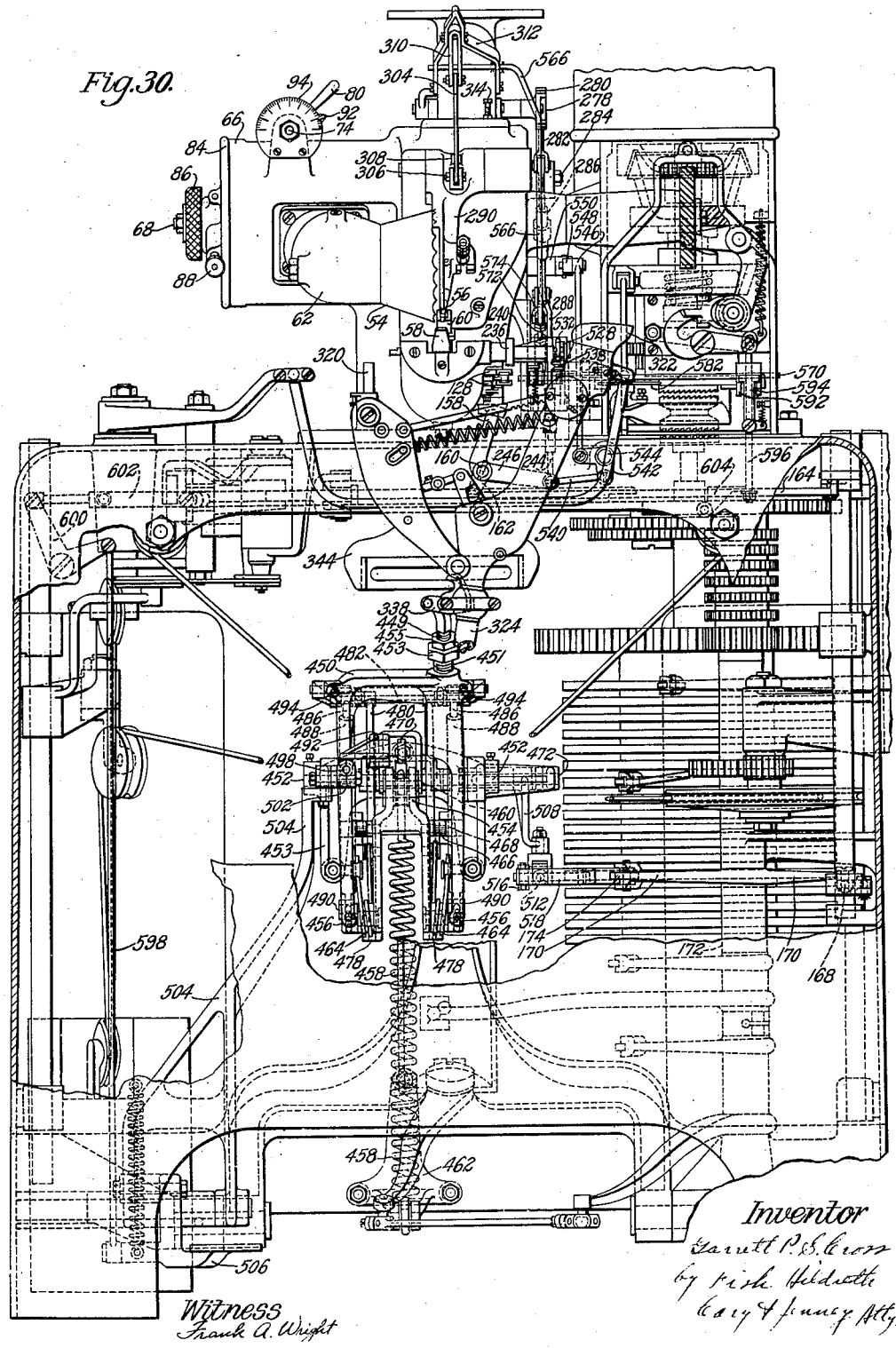
Figure 37:
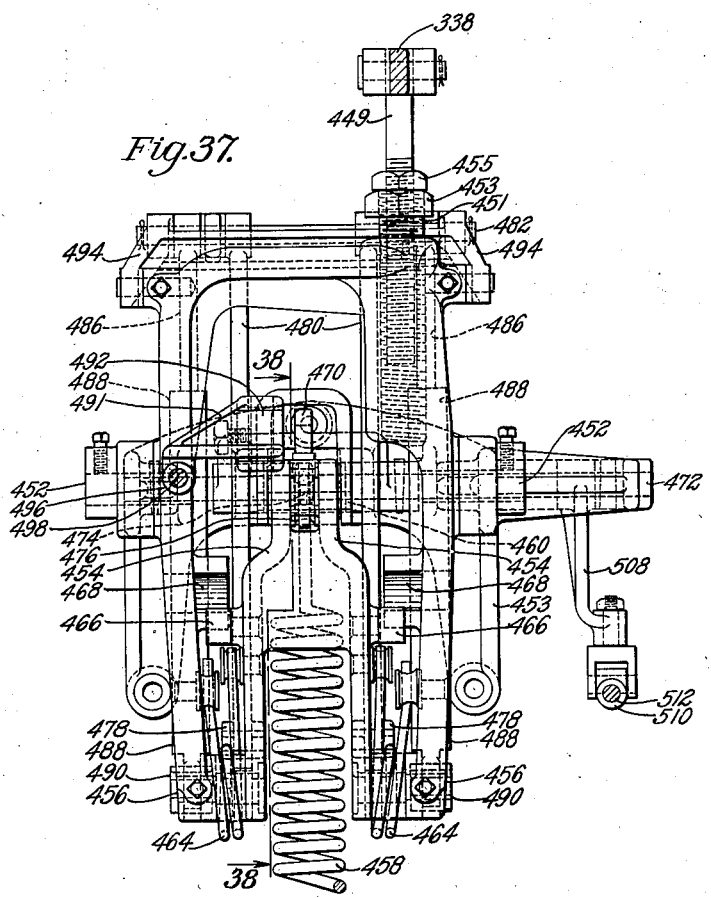
Figure 38:
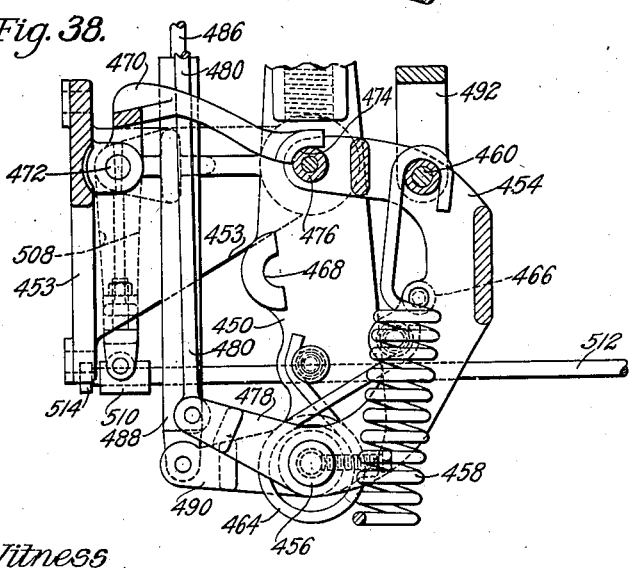
Figure 39:
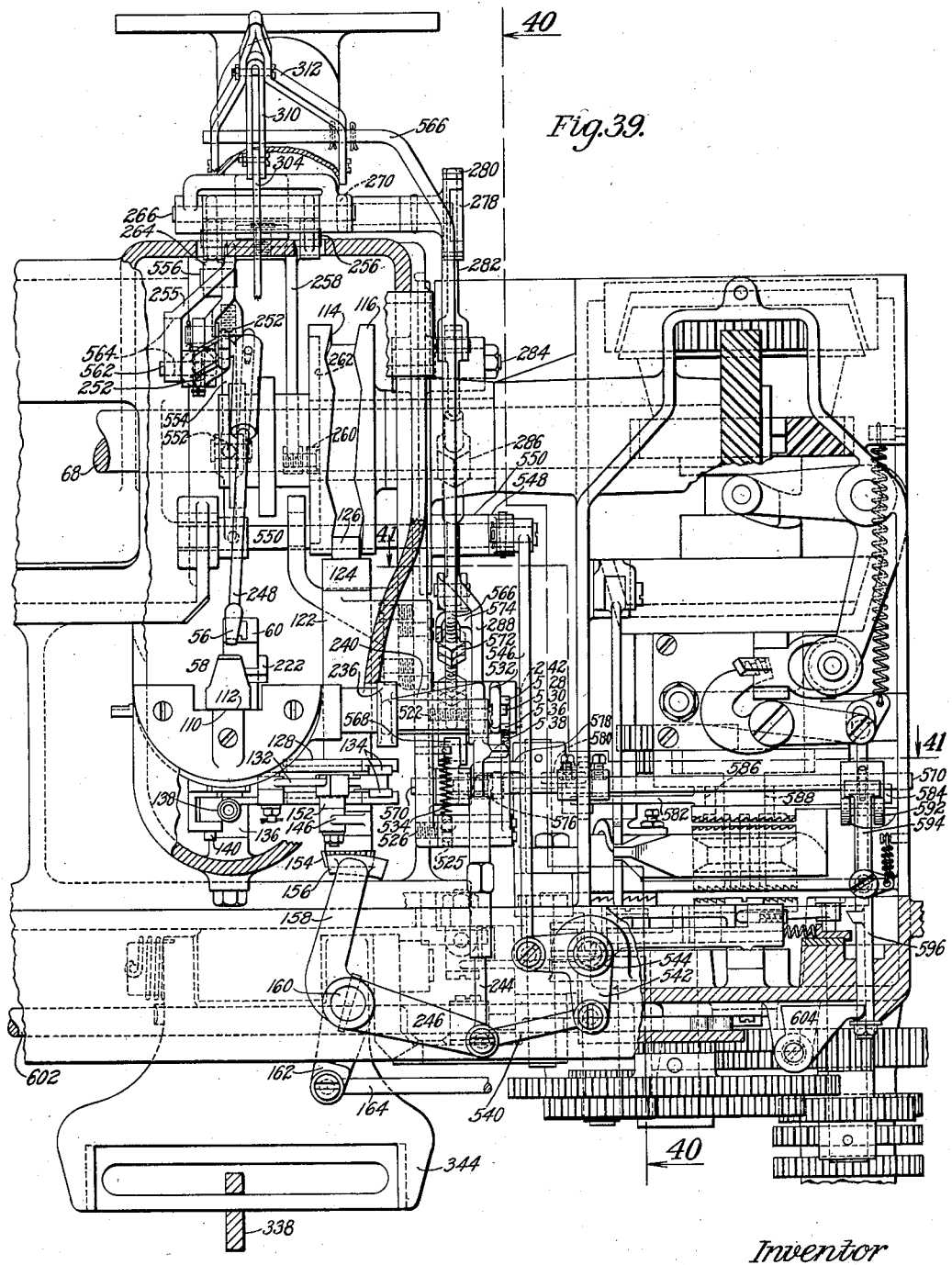
Figure 40:
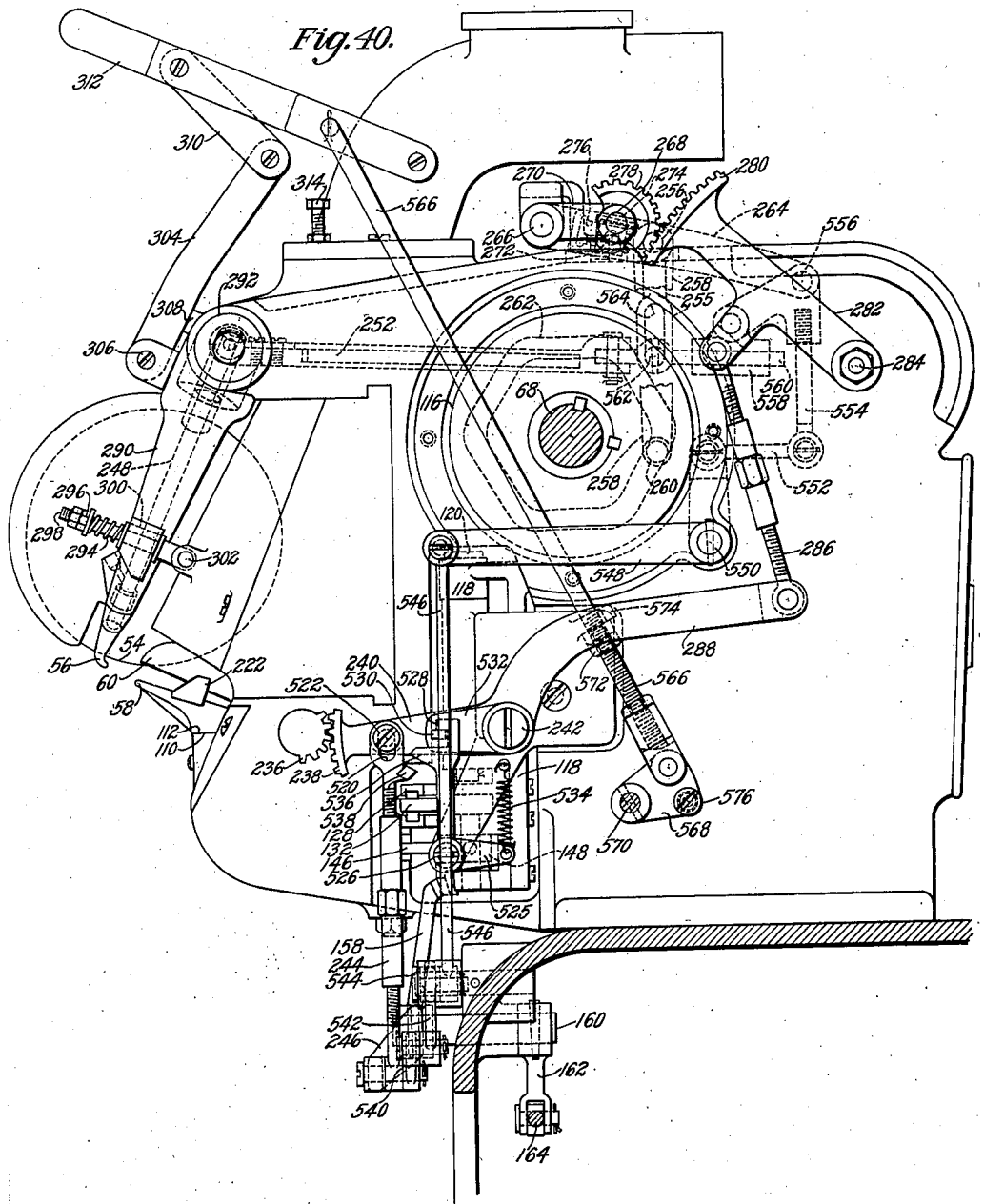
Figure 41:
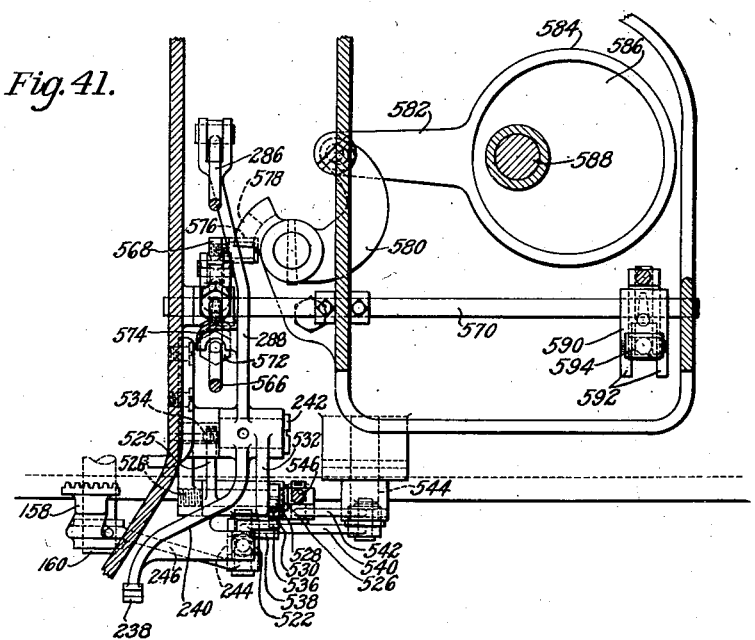

The several features of the invention consist in the devices, combinations and arrangement of parts hereinafter described and claimed which, together with the advantages to be obtained thereby will be readily understood by one skilled in the art, when taken in connection with the accompanying drawings, in which Fig. 1 is a view in right side elevation of the head of a machine embodying certain features of the invention; Fig. 2 is a view in front elevation of the machine head showing substantially the parts of Fig. 1; Fig. 3 is a detail view in right elevation showing particularly the shoe guiding and feeding devices including the channel guide, crease guide and beater member, together with their operating mechanisms; Fig. 4 is a plan view of the machine head partly in section with the upper portion of the casing and some of the parts removed to illustrate particularly the crease guide, the beater member and their actuating mechanisms; Fig. 5 is a view in front elevation partly in section of the machine head illustrating substantially the parts shown in Fig. 4; Fig. 6 is a plan view of the machine head with the upper portion of the casing broken away and the inseam trimming knife removed to illustrate underlying parts; Fig. 7 is a detail view in right side elevation of the crease guide and beater member assembly taken on line 7—7 of Fig. 8; Fig. 8 is a plan view of the parts shown in Fig. 7; Fig. 9 is a detail view of an adjustable connection in the beater actuating mechanism; Fig. 10 is a detail sectional view taken on the line 10—10 of Fig. 8; Fig. 11 is a detail view in right side elevation of the crease guide and a portion of the mechanism for oscillating the crease guide in the line of feed; Fig. 12 is a plan view of the parts shown in Fig. 11; Fig. 13 is a detail view in right side elevation of the beater member and its support; Fig. 14 is a plan view of the parts shown in Fig. 13; Fig. 15 is a view partly in section taken substantially along the line 15—15 of Fig. 14; Fig. 16 is a perspective view of the various parts of the pivotal support assembly separated to illustrate more conveniently the relative positions and functions of the parts; Fig. 17 is a detail view, partly in section, taken substantially on the line 17—17 of Fig. 14 with the key pivot withdrawn to show the relative positions of the parts; Fig. 18 is a plan view of Fig. 17; Fig. 19 is a plan view of the machine with the stop motion and a portion of the casing removed to show underlying parts; Fig. 20 is a detail sectional view in front elevation of a portion of the jack, illustrating particularly the mechanism for opening the jack, parts being shown in their closed or operative position at the start of the operation on a shoe; Fig. 21 is a view similar to Fig. 20 with the toggle straightened just prior to releasing the jack at the end of the operation on a shoe; Fig. 22 is a detail view in front elevation of the lower end of the jack support illustrating particularly the part of the mechanism for opening the jack; Fig. 23 is a view in left side elevation of substantially the parts shown in Fig. 22; Fig. 24 is a sectional plan view taken on the line 24—24 of Fig. 23; Fig. 25 is a detail sectional view in left side elevation illustrating substantially the parts shown in Fig. 23, but with certain portions removed to show underlying parts; Fig. 26 is a sectional plan view taken on the line 26—26 of Fig. 25; Fig. 27 is a detail plan view of the parts shown in Figs. 23, 24 and 25; Fig. 28 is a plan view of a portion of the supporting mechanism for the jack; Fig. 29 is a view in side elevation partly broken away on the line 29—29 of Fig. 28 illustrating particularly the detent or shaft locking mechanism which is actuated at the end of the operation on the shoe to cause the jack to open; Fig. 30 is a view in front elevation of an entire automatic machine embodying certain features of the invention in addition to those illustrated in the preceding figures, portions of the casings being broken away to show underlying parts; Fig. 31 is a view in left side elevation partly in section of the base of the machine shown in Fig. 30; Fig. 32 is a sectional plan view of the base illustrating substantially the parts shown in Fig. 31; Fig. 33 is a plan view on an enlarged scale of a portion of the mechanism shown in Fig. 32 for holding the jack in yielding engagement alternatively with the crease guide or channel guide during the operation on the shoe; Figs. 34, 35 and 36 are similar views in left side elevation illustrating the mechanism shown in Fig. 33 in different operating positions, Fig. 34 showing the parts in the relative positions occupied during the inseam trimming operation with the jack held yieldingly in engagement with the channel guide, Fig. 35 showing the parts in the positions taken during the inseam pounding operation with the jack held yieldingly in engagement with the crease guide, and Fig. 36 showing the parts in the stopped position of the machine; Fig. 37 is a view in front elevation of substantially the parts shown in Figs. 33 to 36 inclusive; Fig. 38 is a sectional view taken on substantially the line 38—38 of Fig. 37; Fig. 39 is a view in front elevation of the machine head and the stop motion with portions of the casing and cutter broken away to illustrate particularly the mechanism controlled from the pattern cam shaft for controlling the direction and amplitude of the feed movements of the beater member, crease guide and channel guide; Fig. 40 is a view in right side elevation partly in section taken substantially on the line 40—40 of Fig. 39; and Fig. 41 is a detail sectional plan view of the eccentric forming part of the stop motion and certain of the connections operated thereby in locking the channel guide out of position upon stopping the machine, taken on line 41—41 of Fig. 39.

The machine illustrated in Figs. 1 to 29 inclusive embodies in a simple form certain fundamental features of the invention, while the machine illustrated in Figs. 30 to 41 inclusive embodies substantially the same features in slightly different form with additional features which improve and make more completely automatic the operation of the machine.

The machine illustrated in Figs. 1 to 29 is provided with a crease guide and a beater member arranged to oscillate in the line of feed in timed relation to the beater stroke to assist the movements of the jack to feed the shoe, and a channel guide arranged to oscillate in the line of feed and timed to supplement the feeding movements of the crease guide and beater member, so that a continuous and even feeding movement is imparted to the work to cooperate with and assist the feeding movements of the jack. In order to permit a reversal in the direction of the reciprocatory feeding movements of the crease guide, beater member and channel guide upon reversal of the movement of the jack at the end of the inseam trimming and welt beating operation, mechanism has been provided which is controlled from a cam on the pattern cam shaft to vary the timing of these reciprocatory movements with relation to the beater stroke to reverse the direction of feed. In the construction illustrated, a single set of cam actuated connections is provided to reverse the direction of feed of the beater member, crease guide, and channel guide, and for simultaneously moving the beater member from a position for beating the welt to its inseam pounding position.

As illustrated particularly in Figures 20 to 29, inclusive, the machine is also provided with a shoe supporting jack comprising means for clamping the shoe in position on the jack, and with means which act automatically at the completion of the second transfer of the operation around the shoe to actuate the clamping means to unclamp the shoe so as to permit its ready removal from the jack.

The operating instrumentalities of the machines disclosed in the drawings include, as in applicant's prior patent above referred to, a rotary cutter 54, a channel guide 56, a crease guide 58, and a beater member 60 which cooperates with the crease guide as the trimming operation progresses around the shoe to beat out the welt, and is thereafter rendered operative during a return movement of the shoe to starting position to pound down the inseam.

The trimming knife 54 as best shown in Figs. 1 and 2, is rotatably mounted in a casing 62 which extends forwardly from a drum 64 mounted for lengthwise and rotational adjustments in the machine head 66. The knife is continuously rotated from a cam shaft 68 extending horizontally through the machine head by means of a bevel gear 70 mounted on the cam shaft 68, and intervening driving connections housed in the casing 62, as indicated generally in dotted lines in Fig. 2, and more fully disclosed in the patent above referred to.

For changing the angular position of the drum 64 to adjust the knife towards or away from the work, a manually operable combined adjusting and clamping device is provided which comprises a gear toothed segment 72 formed on a rotatable shaft 74 and arranged to engage with a corresponding slot 76 formed in the upper surface of the drum 64. The shaft 74 is mounted in an eccentric bore in a cylindrical member or sleeve 78 which is in turn supported in a bearing 79 on the machine head 66, so that rotation of the cylindrical member or sleeve 78 will cause the shaft 74 and gear segment 72 to be depressed into clamping engagement with the slot 76 to lock the drum in its adjusted position. The shaft 74 has a squared end adapted to receive a crank to permit an angular adjustment of the shaft 74 and gear segment 72 to adjust the angular position of the drum 64. A manually operable handle 80 secured to the rear end of the sleeve bearing 78 provides a convenient means for rotating the sleeve 78 to clamp the drum in its adjusted position.

The drum 64 is moved lengthwise to adjust the cutter to compensate for wear by means of a hollow shaft 82 rotatably mounted in a head plate 84 secured to the machine head 66. The shaft 82 is sleeved over the cam shaft 68 and at its inner end is screw-threaded into the end of the drum 64. At its outer end, the shaft 82 is provided with a knurled head 86. A spring-pressed plunger 88 supported on the head plate 84 is arranged to engage in one of a series of holes 90 formed in the periphery of the shaft 82 to lock the shaft in its adjusted angular position.

When it is desired to adjust the position of the trimming knife, the handle 80 and eccentric sleeve member 78 are rotated to the left as viewed in Fig. 2 to unclamp the drum. An adjustment of the knife toward and away from the work can now be made by rotating the shaft 74 and gear segment 72 by means of a crank handle which is fitted over the squared end of the shaft 74. A further adjustment of the drum 64 and knife 54 to take up wear is made by the rotation of the knurled head 86 which acts to move the drum axially, and due to the angular relationship of the groove 76 and gear segment 72, imparts a slight rotational movement to the drum to bring the knife edge back to the desired position. The handle 80 is then moved to the right as shown in Fig. 2 to lock the parts in their adjusted position.

In order to enable the operator quickly and accurately to secure the desired adjustment of the shaft 74 and gear segment 72 to determine the position of the cutter vertically with relation to the work, a pointer 92 has been mounted on the shaft 74, and cooperated with a dial 94 secured to the machine head 66, to inform the operator directly as to the location of the knife with relation to the work. The operator is thus enabled to secure an exact setting of the knife with relation to a previous setting, so that a careful and accurate adjustment can be made with a minimum of time and effort.

In carrying out certain features of the invention, the crease guide 58 and the beater member 60 are supported to reciprocate as a unit in the line of feed, this reciprocation being timed with relation to the beating stroke to assist in the feeding movements of the jack to transfer the point of operation about the shoe. The crease guide 58, as best shown in Figs. 7 to 12 inclusive, is formed on the forward end of a frame 100 which is arranged to oscillate about a vertical pivot shaft 102 which is secured in a supporting bracket 104 on the machine frame, and is arranged at each end to engage in the pivot bearings 106 and 108 formed on the frame 100. There is also formed on the upper side of the bracket 104, a flat bearing surface 110 which is arranged for sliding engagement with a corresponding surface 112 on the under side of the crease guide 58, and provides an additional support for the crease guide against the pounding action of the beater 60. For imparting reciprocatory movements to the crease guide and the beater member supported thereon in timed relation to the beater stroke, connections are provided which are actuated from a peripheral cam 114 formed in a disk 116 on the cam shaft 68 (see Figs. 2 to 6 inclusive). These connections comprise a frame 118 which is supported to turn about a vertical pivot shaft 120 mounted in a supporting bracket 122. At its upper end the frame 118 is provided with an arm 124 which carries a cam roll 126 arranged to engage with the cam 114. Also mounted on the frame 118 are two arcuate-shaped members 128 arranged to form a guideway 130 which at its mid-point is located beneath and substantially in line with the axis of the pivot shaft 120 for the frame 118. The oscillatory movements imparted to the frame 118 are transmitted to the frame 100 through connections which comprise a link 132 pivotally secured at one end to a block 134 adjustably mounted in the guideway 130, and at the other end to one arm of a bell-crank lever 136. The other arm of the bell-crank 136 has a sliding connection with a sleeve member 138 pivotally connected at 140 to a rearwardly extending arm of the crease guide frame 100.

The general mode of operation of the machines herein disclosed is substantially that of the machine of applicant's patent above mentioned, in which machine the point of operation is transferred about the shoe in one direction during the trimming of the insole and the beating out of the welt, and is thereafter transferred in the reverse direction back around the shoe to the starting point during the pounding down of the trimmed inseam. In order to adapt the feeding movements of the crease guide and beater member to this mode of operation, a further feature of the present invention contemplates the provision of means rendered operative simultaneously with the reversal of the direction of feed of the jack to vary the timing of the reciprocatory movements of the crease guide and beater member to reverse the direction of the feeding movements of these parts. The mechanism for varying the timing of the reciprocatory movements imparted to the crease guide and beater member to reverse the direction of feed comprises a lever arm 146 which is secured to turn with a sleeve hub 148 on a vertical pivot shaft 150 supported on the frame 118 in line with the axis of the pivot shaft 120 about which the frame 118 turns. Pivotally supported on the free end of the lever arm 146 is a U-shaped member 152 which is arranged to engage with the link 132. There is also formed on the sleeve hub 148 a gear tooth segment 154 which is arranged to engage with a corresponding gear toothed segment 156 formed on the upper end of the lever arm 158 secured to a rock shaft 160 in the base of the machine. With this arrangement of the parts, the movement of the rock shaft 160 about its pivot acts through the connections above described to impart a corresponding movement to the lever arm 146, and thus to swing the link 132 about its pivotal connection with the bell-crank 136 between the two limiting positions designated in Fig. 12 in full and in dotted lines. It will be seen that when the block 134 moving in its guideway 130 passes beyond the axis of the oscillating frame 118, the direction of the movements imparted to the link 132 is reversed, and thus the timing of the oscillations imparted to the crease guide 58 is correspondingly changed. The rocking movements of the rock shaft 160 are controlled from the pattern cam shaft in timed relation to the operation of the jack through connections which comprise a downwardly extending lever arm 162 on the rock shaft 160, a connecting link 164 (see Fig. 19), a bell-crank 166, a link 168, and a cam lever 170 pivotally mounted intermediate its length on a shaft 172, and having one end connected to the link 168, and its other end provided with a cam roll 174 arranged to engage with the so-called Baltimore cam 176 on the pattern cam shaft 178.

As in the patent above referred to, the beater member 60 is slidably mounted on a lever arm 180 to permit an adjustment of the beater member to either of its two operating positions of beating the welt or the inseam. The beater member 60 is provided on one side with a T-shaped slot which is arranged to fit over a correspondingly shaped track 182 formed in the side of the lever arm 180. The lever arm 180 through which the beating movements are imparted to the beater member 60 is pivotally supported intermediate its length on a laterally extending sleeve member 184 which is mounted in bearings 186 formed in the crease guide supporting frame 100. A rearwardly extending arm of the lever 180 is bored as indicated at 188 to receive a pin 190 which is provided with an offset or eccentric roll 192 to engage in a transverse slot or guideway 194 in an oscillating frame 196 for imparting the required beating movements to the beater member 60. The frame 196 is U-shaped and is mounted at its forward end to turn on the bearing surfaces 200 which are formed in a fixed portion of the machine head substantially on the same line of centers with the sleeve member 184 when this member and the crease guide frame 100 on which it is supported occupy a central or intermediate position. The two arms of the U-shaped frame 196 are connected by means of a hollow cylindrical member which is provided with the slot 194 and also has mounted therein a correspondingly slotted cylinder 198 to provide durable and replaceable flat bearing surfaces for the roll 192. A rearwardly extending arm 199 forming part of the frame 196 is connected through short parallel links 202 to the downwardly extending arm of a cam actuated lever 204 which is pivoted at 206 on the machine frame, and has two arms provided with rolls engaging cams on the shaft extending on opposite sides of the cam shaft 68. The pin 190 may be turned to adjust the position of the eccentric roll 192, and is then locked in the desired angular position to maintain the required adjustment of the limit of the beater stroke toward the work. For this purpose the pin 190 is provided with a collar 212 which has indentations 214 to receive a special tool for turning the pin, and also carries a locking pin 216 which is arranged normally for engagement in one of a series of slots 218 formed in the rear end of the lever 180. The pin 190 is normally held in an advanced position to maintain the pin 216 in locking engagement with a slot 218 by means of a leaf spring 220 mounted in the rear of the slot 194, and arranged to engage with the offset roll 192 of the pin 190. In adjusting the angular position of the pin 190, the pin is first moved against the pressure of the spring 220 to release the pin 216 from its slot 218, and is then rotated to the desired position where it is again locked in position by the engagement of the pin 216 with an adjacent slot 218.

The beater member 60 is mounted on the frame 100 in such a manner as to cause the beater member to oscillate laterally with the frame 100 and crease guide 58 during its beating action to impart the required feeding movements to the work. To this end the beater member 60 and its supporting lever 180 are supported at one point against lateral movement with relation to the frame 100 by engagement between the bearings 186, and adjacent their forward ends are supported between two upwardly extending flanges 222 formed on the crease guide.

With the present construction, a novel and improved mechanism is provided for controlling the position of the beater member 60 in its retracted or advanced position for beating out respectively the welt and the trimmed inseam. This mechanism comprises a rack 224 which is formed on the rear end of the beater member 60 and is arranged to engage with a gear segment 226 rigidly clamped and keyed by the clamping bolt 225 and key 227 to the sleeve pivot 184 for the lever 180 which as above described is supported in the bearings 186 on the crease guide frame 100. The angular position of the sleeve 184 to maintain the beater member 60 in its advanced or retracted position is determined through connections including a portion 229 which is adapted to fit into one of 200 on the machine head, and extends through the pivot sleeve 184. For convenience in assembly, the shaft 228 is provided with an enlarged portion 229 which is adapted to fit into one of the bearings 200, and also provides a pivotal support for one arm of the beater oscillating frame 196. At its other end the shaft 228 is arranged to fit within a sleeve hub 231 formed on the other arm of the frame 196 to engage the second bearing 200. The sleeve 184 is connected to turn with the shaft 228 by means of a universal connection which, as best shown in Figs. 15 to 18 inclusive, comprises a cylindrical key 230 which is fitted into a transverse bore 232 in the pivot sleeve 184, and is slotted to receive a correspondingly flattened portion 234 of the rock shaft 228. With this construction of the parts, a free movement of the pivot sleeve 184 with the lateral movements of the crease guide frame 100 and beater lever 180 is permitted relatively to the stationary shaft 228, while at the same time the shaft 228 and pivot sleeve 184 are rigidly keyed to maintain a corresponding angular position. The shaft 228 at one end is also provided with a gear segment 236 which is arranged to engage with a corresponding gear segment 238 formed on the end of a forwardly extending lever arm 240 pivoted at 242 to the machine frame. The lever arm 240 is connected through an adjustable link 244 to a lever arm 246 secured to the rock shaft 160, so that the movement of the beater member to its advanced or retracted position is controlled through the connections above described operated from the Baltimore cam on the pattern cam shaft.

Another feature of the present invention contemplates the provision of a novel and improved channel guide which is arranged to assist in the feeding movements of the work to provide an even, continuous feed to cooperate with the continuous feeding movement of the jack. The channel guide 56 is provided with an offset nib to engage in the channel, and is secured to the lower end of a rock shaft 248 which is arranged for oscillatory movements timed with relation to the oscillatory movements of the crease guide and beater member to feed the work during the back feed of the crease guide. As best shown in Figs. 1, 2 and 3, the shaft 248 is provided at its upper end with a laterally extending arm 250 which is connected through a ball and socket joint to a rearwardly extending link 252, which is connected at its rear end to a depending arm 254 secured to a pivot shaft 256. There is also secured to the pivot shaft a downwardly extending cam lever arm 258 which carries a cam roll 260 arranged to engage with a cam groove 262 in one face of the cam disk 116. Oscillatory movements are imparted to the channel guide through these connections in timed relation to and approximately 180° out of phase to the feeding and beating movements of the crease guide and beater member to provide a continuous and even feed of the work.

In order to cooperate with the feeding movements of the jack and the crease guide and beater member in a reverse direction during the return movement to transfer the point of operation about the shoe a second time to starting position, it has been found desirable to provide means for changing the timing of the oscillatory movements of the channel guide 56 to reverse the direction of the channel guide feeding movements. To this end the pivot shaft 256 carrying the cam lever 258 is mounted on a swinging frame 264 which is pivoted at its forward end on a shaft 266. In order to reverse the timing of the oscillatory movements of the channel guide 56, the frame 264 is raised or lowered about its pivot 266 to correspondingly raise or lower the pivot shaft 256 and cam lever 258 so that the angular position of the cam roll 260 with relation to the cam shaft 68 is altered to produce the desired reversal in the direction of feed. The position of the frame 264 is controlled through connections from the pattern cam 176 hereinbefore referred to comprising a crank shaft 268 which is mounted in a rearwardly extending bracket 270, and carries a crank 272 which is provided with a block 274 arranged to slide in a slot 276 formed in one arm of the frame 264. Also secured to the crank shaft 268 is a gear segment 278 which engages with a corresponding gear segment 280 formed on the end of a lever arm 282 pivoted at 284 on the machine frame. The lever arm 282 is connected through an adjustable link 286 to an arm 288 secured to turn with the rock shaft 242, which is in turn actuated as above described through link 244, rock shaft 160 and other intervening connections from the cam 176.

In the construction shown in Figs. 1 to 29 inclusive it will be seen that the cam 176 operating through the cam lever 170 and the connections controlled therefrom as above described, operates at the end of the inseam trimming and beating operation upon reversal in the direction of feed of the jack, simultaneously to reverse the direction of feed of the channel guide to reverse the direction of feed of the crease guide and beater member, and to advance the beater member from its welt beating to its advanced inseam beating position.

In order to provide an adequate support for, and control the position of the channel guide 56, the oscillating shaft 248 is mounted to turn in bearings formed in a casing 290 which is mounted at its upper end to swing about a fixed pivot 292 formed on the machine frame. The casing 290 and channel guide 56 supported thereby are normally held yieldingly inwardly in operating position by means of a compression spring 294 seated between the casing 290 and check nuts 296 on a supporting rod 298 which extends through a slot 300 in the casing, and is pivotally connected at 302 to the machine head. To facilitate the insertion or removal of the shoe from the machine, mechanism is provided for moving the channel guide away from the work against the pressure of its spring 294 and for locking the channel guide in its retracted position. This mechanism comprises a lever arm 304 connected at 306 to the casing 290, and also arranged to rest against a bearing surface 308 thereon. The lever arm 304 at its upper end is connected through a short link 310 to a manually operable lever 312 pivotally secured to the machine head. As will be seen from the drawings, the lever 312 and link 310 are so arranged that as the lever 312 is moved downwardly, the line of centers of the two pivotal connections on the lever 312 will pass below the pivotal connection of the lever arm 304 with the link 310, thus causing these parts to act as a toggle to lock the channel guide in its retracted position. An adjustable set screw 314 mounted on the machine head to engage with the lever 312, provides a positive stop for limiting the downward movement of the lever 312 after the toggle has passed its central position.

The shoe supporting jack and its supporting mechanism generally referred to as the Iron Man base of the machine as illustrated in Fig. 19 of the drawings, is similar in many respects to the mechanism and arrangement of parts disclosed in Patent No. 1,689,594 above referred to. This mechanism is indicated in Fig. 19 of the drawings and with the exception of certain features hereinafter to be described, is identical with that shown in Figs. 30 and 31. As illustrated in these figures, the jack comprises a heel support 320 and a toe rest 322 which is formed on the upper end of a spindle 324. The lower end of the jack spindle is secured to a hemispherical shell or casing 326 connected by means of a gimbal joint with a wheel 328 which is mounted to rotate on a vertical axis in a casing carried at the forward end of a supporting arm 330, the rear end of which arm is mounted to swing vertically about an axis at the upper end of a support 332. The support 332 is pivoted on a second support 334 to swing laterally of the machine, the support 334 in turn being mounted to swing forwardly and rearwardly, so that the spindle at its lower end may be moved in any required direction to impart the required tipping and positioning movements to the jack as the point of operation is transferred about the shoe. The jack spindle is yieldingly supported vertically by means of two cords 336 which are secured to the arm 330 and pass upwardly over pulleys to a counterweight.

During the operation of the machine on the shoe, the shoe is held at all times by the crease guide and channel guide in the correct operating position. In the embodiment of the invention shown in Figs. 1 to 29 inclusive, the jack is balanced to impart a slight upward movement of the jack to maintain the shoe at all times in operative engagement with the channel guide 56.

Tipping and positioning movements are imparted to the shoe to change the relative positions of the shoe and the devices for operating upon it to compensate for the longitudinal and transverse curvatures of the shoe sole as the point of operation of the operating devices is transferred about the shoe through connections controlled by cams on the pattern cam shaft 178. These connections are substantially the same as those shown and described in Morrill patent No. 1,689,594 above referred to. Further description of this mechanism is therefore believed unnecessary. There is also provided a control rod 338 which is secured at its forward end to a universal joint located at an intermediate point on the supporting spindle 324 for the jack, and at its rear end, as shown in Fig. 19, is connected to one end of a link 340 pivotally secured at 342 to the Iron Man base. This control rod as shown in this figure, performs substantially the functions ascribed to it in Morrill Patent No. 1,689,594 above referred to, being provided intermediate its length with a notched portion which is arranged to engage with the cross bar of a swinging frame or so-called trap door 344 to advance and lock the jack out of operating position.

Another feature of the present invention contemplates the provision of a novel and improved mechanism which will operate upon moving the jack away from the operating devices at the completion of the operation on the shoe to open the jack and unclamp the shoe. With shoe supporting jacks of the general type herein disclosed which have been heretofore developed, the operation on the shoe is normally completed during the rotation of the jack in one direction. The jack and shoe supported thereon are then moved away from the the shoe operating devices and rapidly rotated in a reverse direction to starting position, and this return movement is utilized to open the jack against the pressure of the heavy clamping spring for holding the shoe in position on the jack. With the present construction, mechanism has been devised which will operate upon moving the shoe away from the operating devices to open the jack and unclamp the shoe independently of any further rotational movements of the jack. As shown particularly in Figs. 19 to 29 inclusive, the mechanism for holding the parts of the jack normally in shoe clamping position comprises a tension spring 346 connecting the heel member 320 and toe 322. The mechanism for opening the jack against the pressure of this spring comprises the toggle links 348, one of said links being pivotally connected at 350 to the heel support 320, and the other of said links being connected to an upwardly extending lever arm 352 mounted to turn on a pivot 354 journalled in the toe support 322. There is also mounted to turn on the pivot 354 a lever arm 356 which carries at its upper end a stop screw 358 adapted to engage with a corresponding abutment 360 on the lever 352, and at its lower end is provided with a bevel gear segment 362 which is arranged to mesh with a bevel gear 364 formed on the upper end of a shaft 366 extending lengthwise of and housed within the supporting spindle 324 for the jack. A small tension spring 369 connecting the levers 352 and 356 tends to hold the stop screw 358 in engagement with the abutment 360. The lower end of the shaft 366 is provided with a bell-shaped member 368 which is housed within the bell 326 and is connected through gimbal bearings to a vertically arranged shaft 370 which extends centrally downwardly through the bearing of the wheel 328 in the end of the casing 330. At its lower end the shaft 370 has secured thereto a sleeve member 372 which carries a flanged plate 374, to the under side of which is secured one end of a heavy coil spring 376 which is utilized for opening the jack. The spring 376 is supported within a casing 378 which is constructed with supporting cylindrical walls inside and outside the spring, and is arranged to fit into a cylindrical-shaped bracket 380 forming a part of the casing 330 for supporting the jack. The coil spring 376 is secured at its lower end to the bottom of the casing 378. The casing 378 is in turn secured against rotational movement in the bracket 380 by the engagement of a spring-pressed plunger 382 (see Fig. 24) supported on an extension 384 of the bracket 380 with one of a series of indentations 386 formed in the flanged upper end of the outer wall of the casing 378. This construction enables an adjustment of the tension of the spring 376 to be readily made by merely withdrawing the plunger 382 and rotating the casing 378 to the desired position when the plunger 382 is again released, and permitted to engage with the corresponding indentation 386.

The spring 376 is maintained under considerable tension, and is arranged to rotate the plate 374, shaft 370, and shaft 366 in a counter-clockwise direction as seen in plan view. This movement of the shafts 366 and 370 and the plate 374 under the pressure of the spring 376 is limited by the engagement of an abutment 388 on the disk 374 with a stop member 390 mounted in a recess 391 formed in a plate 392 which is adjustably secured to the under side of the jack supporting casing 330 concentrically with the shaft 370. In order to take up the shock, the stop 390 is spring-seated by a spring 394 coiled about the stop member between a shoulder on the stop member 390 and a corresponding shoulder in the recess 391 within which the stop member is mounted. In order to permit an adjustment of the position of the stop member 390 and plate 392, the plate is provided on its under side with a series of corrugations which are adapted to engage with corresponding corrugations formed on the head of a clamping screw 396 which extends through an arcuate slot 398 formed in the plate 392 and through the casing 330, and is held in clamping position by a cooperating nut threaded thereto.

There is also provided mechanism which is arranged to lock the shafts 366 and 370 to rotate with the jack so that a movement of the jack in a clockwise direction, as shown in plan view, will act to rotate these parts including the plate 374 in a clockwise direction away from the stop 390 to wind up the spring 376. This mechanism comprises a detent plunger 400 which is mounted on the bell-shaped base 326 of the jack supporting spindle, and is adapted to engage in a recess 402 formed in the bell-shaped member 368 formed in the lower end of the shaft 366. At its outer end the detent pin 400 is arranged to engage with one end of a spring-pressed lever 404 which is secured to a pivot pin 405 journalled in a bracket 406 on the jack supporting spindle 324. A spring-pressed plunger 408 mounted in a recess in the bracket 406 and arranged to bear against an arm of the lever 404 tends normally to hold the detent pin 400 yieldingly in position to engage in the slot 402. The lever 404 is moved against the pressure of its spring 408 to raise the detent pin 400 and permit the rotation of the shafts 366 and 370 under the influence of their spring 376 to open the jack through mechanism which comprises a downwardly extending arm 410 secured to the pivot pin 405, and connected by a link 412 to a downwardly extending arm of a bell-crank lever 414 pivotally mounted on the bracket 406. The horizontally disposed arm of the bell-crank 414 is provided with a cross arm 415 which is arranged to provide a relatively broad contact surface for engagement with a trip mechanism rendered operative as the jack is moved outwardly to inoperative position to engage with and depress the bell-crank and trip the detent pin 400 to open the jack.

The mechanism for tripping the lever 414 to release the shoe as the jack is moved outwardly to its inoperative position comprises a jack releasing trip lever 416, as best shown in Figs. 23, 25 and 27, provided with a sleeve hub 418 arranged to turn on a sleeve bearing member 420 adjustably secured to a trip lever carrier 422. For adjusting the position of the bearing member 420 and the trip lever 416 in one plane, the bearing member 420 is provided with a fine tooth face 424 arranged to engage with a correspondingly corrugated surface 426 on the carrier 422. A clamping bolt 428 extending through the center of the bearing member 420 and through a slot formed in the carrier 422 serves to clamp the bearing member adjustably in position on the carrier 422. A tension spring 430 extending between an offset arm of the carrier 422 and the rear end of the trip lever 416, tends to hold the lever in a raised position in engagement with a U-shaped stop 432 on the forward end of the carrier. The carrier 422 is mounted for adjustment in a bracket 434 having secured thereto a clamping bolt 436 arranged to extend through an arcuate slot 438 in the bracket 434. The bracket 434 is in turn mounted for lateral adjustment on the jack supporting frame 330, having secured to its lower end a block 440 which is adjustably positioned in a track 442 on the jack supporting frame 330.

The mechanism above described for opening the jack to release the shoe operates as follows,—starting with the parts in the positions shown in Fig. 20 which illustrates the position of the jack upon starting the operation upon a shoe, it will be noted that the toggle links 348 are broken, and the shaft 366 carrying the bevel gear 364 has been turned to the limit of its movement in a counterclockwise direction by the spring 376 to bring the shoulder on the disk 374 into engagement with the fixed stop 390. As the point of operation progresses about the shoe, the jack is rotated in a counterclockwise direction through substantially 180°. Inasmuch as the shaft 366 and bevel gear 364 are during this operation held in the stationary position described by the spring 376, the rotational movement of the jack causes the gear segment 362 which is rotating with the jack to be moved to the position shown in Fig. 21, causing the toggle links 348 to be straightened. Also, as the jack reaches the limit of its movement in a counterclockwise direction, the detent pin 400 mounted on the jack spindle comes into engagement with the recess 402 formed in the bell-shaped base 368 of the shaft 366, so that as the jack is now rotated in a clockwise direction to its original position, the shaft 366 is locked to turn with the jack and the jack spindle 324, causing the plate 374 to be rotated in a clockwise direction away from the stop 390 against the pressure of the heavy spring 376. It will be seen that by the time the jack is returned to its initial starting position, the mechanism for opening the jack has been fully set with the toggle in its straightened position, and the spring loaded to perform the operation of opening the jack. After the completion of the operation on the shoe, and as the shoe is being moved outwardly to its inoperative position, the contact surface of the cross arm 415 on the bell crank lever 414 is brought into engagement with the trip lever 416 to cause the release of the detent pin 400, so that the shaft 366 is permitted to turn in a counterclockwise direction under the pressure of the spring 376 until arrested by the engagement of the shoulder on the disk 374 with the fixed stop 390. This rotational movement of the shaft 366 and the bevel gear 364, acts to move the lever 356 about its pivot, carrying with it the lever 352 and the rigidly held toggle links 348 to open the jack. The toggle 348 is broken upon placing a new shoe in the jack to permit the closing of the jack to clamp the shoe firmly in position by means of mechanism common to jacks of this type and not here shown.

The machine illustrated in Figs. 30 to 41 is identical in all respects with that previously disclosed, except for the novel and improved features hereinafter to be described. In view of the similarity of the two structures, the same reference characters have been applied to identical parts.

One of the features embodied in the machine illustrated in Figs. 30 to 41 is concerned with the provision of mechanism for more accurately controlling the positioning and feeding of the work with relation to the operating devices during the inseam trimming and welt beating operations. In order to position the work, it has been customary in inseam trimming and welt beating machines to utilize a crease guide which engages between the upper and insole to determine the position of the shoe edge with relation to the beating and inseam trimming devices. This mode of operation, particularly as applied to an automatic machine, has not proved to be wholly satisfactory in that the leather of the upper sometimes tends to bunch up particularly around the toe of the shoe, and thus provide an uneven surface for engagement with the crease guide, and interfere with the proper positioning and uniform feeding of the shoe past the operating devices. With the present construction, it is contemplated to utilize the channel guide for positioning the shoe with relation to the operating devices during the inseam trimming and welt beating operation. The channel guide operates in a crease formed between the bottom of the insole and the ridge formed by the untrimmed inseam. This ridge is a substantially uniform distance from the sole edge, and preserves along its inner edge a substantially even contour around the fore part of the shoe. During the return movement of the jack and the shoe supported thereon to its initial starting position during the inseam pounding operation, the channel guide is unavailable for guiding the shoe due to the fact that the ridge formed by the inseam has been substantially levelled off. During the return movement of the jack, therefore, the shoe is guided by the crease guide in the usual manner.

The control devices for the jack are arranged, in the construction disclosed in Figs. 30 to 41 inclusive, so that a yielding outward pressure is maintained on the jack and shoe supported there on against the channel guide during the edge trimming and welt beating operation, whereas, during the return movement of the jack to pound out the inseam, a yielding inward pressure is maintained upon the jack and shoe supported thereon to position the shoe against the crease guide. For this purpose the control rod 338 is pivotally secured at its rear end to the upper end of a frame 450 which is mounted intermediate its length to turn on two pivot studs 452 secured in a bracket 453 fixed to the machine base. A vertical adjustment for the rear end of the rod 338 is provided by means of a vertical rod 449 to the upper end of which the rear end of the control rod is pivotally connected and a sleeve 451 which is internally threaded to receive the rod 449, and is externally threaded to fit into a correspondingly threaded recess in the frame 450. A nut 453 formed on the upper end of the sleeve 451 is provided to permit a ready adjustment of the position of the sleeve, and a locking nut 455 on the threaded portion of the rod 449 serves to lock the sleeve in its adjusted position.

In the illustrated construction, a toggle spring mechanism is provided which acts on the pivoted frame 450 during the inseam trimming operation to force the jack and shoe outwardly against the channel guide, and which is automatically adjusted at the end of the inseam trimming operation to exert a yielding pressure inwardly on the frame to hold the jack and shoe supported thereon against the crease guide. The toggle mechanism referred to, comprises a frame 454 which is mounted to swing within the frame 450 on two pivot studs 456 secured respectively to the two downwardly extending members forming part of the lower end of the frame 450. A heavy tension spring 458 connected at one end to a pin 460 on the frame 454, and at its other end to a bracket 462, acts for one position of the frame 454 to impart a yielding outward movement to the jack, and for another position of of the frame 454 to impart a yielding inward movement of the jack. For controlling the position of the frame 454, a pair of springs 464 are coiled respectively about the pivot studs 456 and connected at opposite ends respectively to the frames 450 and 454, and tend to hold the frame 454 yieldingly in its limiting position toward the rear of the machine. The movement of the frame 454 about its pivot under the pressure of the springs 464 is positively limited by the engagement of two pins 466 formed on the frame 454 with corresponding stop surfaces 468 on the frame 450. For holding the lever frame 454 in an advanced position against the pressure of the springs 464 so that the tension spring 458 will tend to move the jack forwardly against the channel guide, a lever 470 is mounted on a rock shaft 472 in the machine frame, and is provided at its forward end with an arcuate surface 474 which is arranged to engage with a roll 476 on the frame 454. The parts are so arranged that the lever arm 470 engages with the roll 476 for positioning the roll exactly on the line of the axis of the pivot centers 452 for the frame 450, so that the frame 454 is to all intents and purposes rigidly connected to the frame 450 and will move therewith as one piece. In order to cushion the movement of the frame 454 with relation to the frame 450 under the pressure of the springs 464, a dash-pot mechanism is provided which comprises a pair of laterally extending members 478 rigidly secured to the lower end of the frame 454, which are connected through vertical rods 480 with a transverse rod 482 which is supported at its ends on two arms 494 pivoted to the frame 450. The rod 482 is also connected to two pistons 486 which are arranged to slide in corresponding dash-pot cylinders 488 secured at their lower ends to rearwardly extending arms 490 formed on the lower end of the frame 450. With this arrangement of parts, the movement of the frame 454 in either direction acts through the links 480 to force the rod 482 up or down against the action of the dash-pots 488, so that the desired cushioning effect is obtained with regard to the movement of the frame 454.

When an operation is begun on a shoe, the frame 454 is moved forwardly against the pressure of its springs 464 until the latch member 470 is permitted to drop behind the roll 476 to lock the frame 454 in its advanced position, as indicated in Fig. 34, so that a yielding outward pressure will be exerted by the spring 458 upon the jack. The connections for advancing the frame 454 are controlled from the starting treadle of the machine, and comprise a block 492 pivoted on the bearing pin 460 on the frame 454, and having pivotally secured thereto an arm 491. At its outer end the arm 491 is provided with a sleeve bearing 496 which is arranged to receive a rod 498 which at its rear end is provided with a shoulder or stop 500 to limit the movement of the rod through the bearing, and at its forward end is clamped to a block 502 pivotally secured to the upper end of an arm 504 formed on the treadle lever 506 of the machine.

After the completion of the inseam trimming and welt beating operation, and as the direction of rotation of the jack is reversed to transfer the point of operation around the shoe a second time to starting position, connections are rendered operative to lift the latch lever 470 out of engagement with the roll 476 to permit the return of the frame 454 under the pressure of its springs 464 to its rear position as shown in Fig. 35, to cause the jack and shoe supported thereon during the return inseam beating operation to be supported against the crease guide. This mechanism comprises a downwardly extending arm 508 secured to the rock shaft 472 which supports the latch lever 470. At its lower end the arm 508 has pivotally secured thereto a sleeve member 510 which is arranged to receive the end of a rod 512 which is provided with a shoulder or stop 514 to limit the movement of the rod through the sleeve, and at its forward end is rigidly clamped in a socket formed in a member 516 which is in turn pivotally mounted on a bearing formed in a member 518 secured to the cam lever 170. The connections above described are arranged to permit a certain amount of lost motion, so that the relatively small variations in the height of the cam to produce variations in the rate of feed as hereinafter described, will not disturb the setting of the jack tension control. When, however, the high portion of the cam is reached, the connections above described are rendered operative to reverse the direction of the tensioning pull on the jack, the stop 514 engaging with the end of the sleeve bearing 510 to raise the latch lever 470 and permit the frame 454 to move to its rear position under the pressure of its spring 464, so that the toggle spring 458 is positioned to exert a rearward pull on the jack to maintain the shoe in engagement with the crease guide.

Additional features of the invention, as illustrated more particularly in Figs. 32, and 39 to 41 inclusive, are directed to the provision of means for imparting variations in the rate of feed of the crease guide, beater member and channel guide corresponding to variations in the jack feeding rate controlled from the pattern cam mechanism to slow down the operation around the toe and other sharply curved portions of the shoe sole. Additional features are also embodied in connections for relieving the channel guide from the work during the return movement of the jack during the beating out of the inseam and, at the end of the operation on the shoe, for moving the channel guide to an inoperative position to permit the movement of the jack and shoe supported thereon away from the operating devices. With the construction and arrangement of the parts, as shown in Figs. 39 and 40, substantially the same connections as those above described and illustrated in Figs. 1 to 19 are provided controlled from the cam 176 for reversing the direction of feed of the crease guide and beater member, for moving the beater member from its retracted to its advanced position, and for simultaneously reversing the direction of feed of the channel guide. In order to secure variations in the feeding movement of the crease guide and beater member, the cam has been designed to vary within narrow limits the position of the link 132 in the guideway 130 to vary the length of the oscillatory movements imparted to the crease guide. In the construction shown, see particularly Fig. 12, the amplitude of movement imparted to the crease guide will be at a maximum with the link 132 and blocks 134 secured thereto located at the end of their movement in either direction in the guideway 130, whereas, the movement will be substantially zero when the link 132 and blocks 134 occupy a central position on the guideway 130. In view of the almost continuous shifting of the rock shaft 160 controlled by the cam 176 to vary the rate of feed as desired, it has been found preferable to provide a certain amount of lost motion in the connections for moving the beater member from its welt beating to its inseam pounding position so that the beater member may be maintained at all times in one or the other extreme position. For this reason, as shown best in Figs. 39 and 40, the vertical link 244 connecting the horizontal arm 246 on the shaft 160 with the actuating lever 240, is provided at its upper end with a slot 520 to receive a pin 522 on the horizontal lever arm 240, so that a certain amount of lost motion is provided before the movement of the link 244 from its limiting position in either direction will disturb the setting of the lever 240. The lever 240 is provided with a rearwardly extending arm which is connected through the link 286 to the lever arm 282 which is actuated as above described to reverse the direction of feed of the channel guide. In acordance with a feature of the invention, a latch mechanism is provided to maintain the lever arm 240 in the extreme position in either direction to which it is moved by the lengthwise movements of the link 244. This mechanism comprises a bell-crank shaped latch lever 525 which is pivoted at 526 to the machine frame, and is provided with an offset nib or latch 528 which is arranged to engage above or below a nib 530 formed on a horizontal arm 532 secured to the rock shaft 242 to which the lever 240 is secured. A tension spring 534 connected to the horizontally extending arm of the bell-crank 525 tends to maintain the latch at all times in engaging position above or below the nib 530. In order to facilitate the shifting of the lever arm 240 from one position to the other and to prevent possible breakage of parts, the latch lever 525 is provided with a V-shaped nib 536 located in the path of the corresponding cam 538 secured to the vertically extending link 244, so that as the link 244 is moved up or down upon reversal of the direction of feed, the cam 538 will engage with the nib 536 to move the latch 528 out of operative position to permit the movement of the nib 530 to its alternative position on the other side of the latch.

Connections are also provided, which are controlled from the cam 176 and the rock shaft 160 for imparting the required variations in the rate of feed to the channel guide 56. These connections (see Figs. 39 and 40) comprise a link 540 which is connected at one end to the lever arm 246 on the rock shaft 160, and at its other end to the downwardly extending arm of a bell-crank 542 pivoted at 544 on the machine frame, and having its other arm connected by a link 546 to the horizontal arm of a bell-crank 548. This bell-crank 548 is pivoted at 550 on the machine frame, and is in turn connected through a link 552 to the downwardly extending arm of a bell-crank 554 which is pivotally mounted at 556 on an extension of the lever arm 264 which also carries the depending cam actuating lever 258. The horizontal arm of the bell-crank 554 has pivotally secured thereto a sleeve member 558 arranged to receive a horizontally situated rod 560 which is pivotally connected at its forward end to the link 252 for imparting the required reciprocatory movements to the channel guide. The link 252 and the rod 560 are driven from the depending oscillatory cam lever 255 through a sliding connection comprising a roll 562 mounted on the rod 560 and arranged to ride in a vertical slot 564 formed in the cam lever 255. With this arrangement of parts, the rocking movements imparted to the rock shaft 160 from the cam 176 act through the connections described to raise or lower the rod 560 and pin 562 in the slot 564, thus moving these parts toward and away from the fulcrum of the cam lever 255, and thus varying the amplitude of the reciprocatory movements imparted to the channel guide to vary the length of the feeding stroke.

There is also provided in the machine shown in Figs. 30 to 41 inclusive a controlling mechanism which is rendered operative on reversal of the direction of feed at the end of the inseam trimming and welt beating operation to move the channel guide slightly away from the work, and which further acts at the end of the operation on the shoe to move the channel guide to inoperative position to permit the movement of the shoe away from the operating devices. This mechanism (see Figs. 39 and 40) comprises a rod 566 connected at its upper end to the hand lever 312 for moving the channel guide out of operative position, and at its lower end connected to a triangular-shaped lever 568 which is secured to a pivot shaft 570 on the frame of the machine. Somewhat above its lower end the rod 566 is provided with an adjustable nut and check nut designated at 572 which serve as an adjustable stop to engage with a corresponding lug 574 on the rearwardly extending lever arm 288. When the direction of feed of the jack is reversed, the corresponding downward movement of the lever arm 288 causes the lug 574 to engage with the adjustable stop 572 to slightly depress the rod 566 and move the channel guide slightly away from the work.

In order to depress the rod 566 and the hand lever 312 at the end of the operation on the shoe to set the toggle link 310 and thus lock the channel guide in its inoperative position, there is provided on the triangular lever 568, a roll 576 which is arranged in the path of a cam 578 (Fig. 41) formed on the under side of a lever arm 580 which carries the gear segment for operating the so-called trap door to move the jack out of operating position at the end of the operation on the shoe. The lever arm 580 is connected to an arm 582 which carries a ring or strap 584 arranged to engage with the periphery of an eccentric disk 586 supported on a vertical shaft 588. This eccentric forms part of the stop motion of the machine which is substantially that illustrated and described in Morrill Patent No. 1,689,594 above referred to. At the completion of the operation on the shoe, the eccentric 586 is rotated through substantially one revolution starting from the rest position shown in Fig. 41, to rock the lever arm 580 and operate the trap door to depress and move the jack out of operating position. During the course of the movement of the arm 580, the roll 576 is engaged by the cam 578 to depress the rod 566 to raise and lock the channel guide in its inoperative position as above described.

The rod 566 and the hand lever 312 are raised automatically upon starting the machine to break the toggle connection formed by the link 310 and lever 312 to permit the return of the channel guide to its operative position under the pressure of the spring 294 through connections which form a part of the stop motion of Morrill Patent No. 1,689,594 above referred to, and are rendered operative by the movement of the foot treadle in starting the machine. These connections comprise a bracket 590 which is rigidly secured to the pivot shaft 570 and has formed thereon two parallel arms 592 which are arranged to engage under the T-shaped head of a vertical rod 594. The rod 594 at its lower end is connected to move with a vertical control rod 596 which forms part of the stop motion of the machine. The control rod 596 is depressed to start the machine by the operation of the foot treadle through connections which comprise a vertical rod 598 connected at its lower end to the foot treadle 506 and at its upper end to a bell-crank 600. The other arm of the bell-crank is connected to a horizontally located rod 602 which extends laterally across the upper front portion of the base of the machine, and is arranged upon the downward movement of the foot treadle to engage with and rock a lever 604 which, in turn, engages with and depresses the control rod 596. The corresponding rotational movement imparted to the pivot shaft 570 acts through the triangular lever 568 and rod 566 to raise the hand lever 312 and release the toggle link 310. A certain amount of lost motion is provided between the T-shaped head of the rod 594 and the arms 592 to permit the partial downward movement of the hand lever 312 and rod 566 at the end of the inseam trimming and welt beating operation to permit the withdrawal of the channel guide at this time as above described.

The nature and scope of the present invention having been indicated, and an embodiment of the several features of the invention having been specifically described, what is claimed is:

1. A machine for operating upon shoes having, in combination, devices for operating upon the margin of a shoe, a shoe supporting jack, means for actuating the jack to transfer the point of operation about the shoe, and thereafter to cause the point of operation to be transferred about the shoe a second time in a reverse direction, feeding devices engaging the shoe to feed the shoe past the operating devices, and means acting upon reversal in the direction of movement of the jack to reverse the direction of feed of said feeding devices.

2. A machine for operating upon shoes having, in combination, devices for operating upon the margin of a shoe, a shoe supporting jack, means for actuating the jack to transfer the point of operation about the shoe, and thereafter to cause the point of operation to be transferred about the shoe a second time in a reverse direction, said means also acting to vary the rate of feed of the shoe during the operation upon designated portions of the margin of the shoe, feeding devices engaging the shoe to feed the shoe past the operating devices, means acting upon reversal in the direction of movement of the jack to reverse the direction of feed of said feeding devices, and means for varying the rate of feed of said feeding devices to correspond to the feeding rate of the shoe.

3. A machine for operating upon shoes having, in combination, devices for operating upon the margin of a shoe arranged during the transfer of the point of operation about the shoe in one direction to perform one operation, and thereafter during the transfer of the point of operation about the shoe in an opposite direction to perform a second operation on the shoe, feeding devices comprising cooperating members, means for actuating said members to intermittently grip the shoe, means for reciprocating said members simultaneously in the line of feed in timed relation to said gripping action to feed the shoe, and means acting when rendered operative to vary the relative timing of said gripping and feeding movements to reverse the direction of feed.

4. A machine for operating upon shoes having, in combination, devices for operating upon the margin of a shoe arranged during the transfer of the point of operation about the shoe in one direction to perform one operation, and thereafter during the transfer of the point of operation about the shoe in an opposite direction to perform a second operation on the shoe, feeding devices comprising a shoe feeding member arranged to reciprocate in the line of feed, means for actuating said member to engage with and feed the shoe during the movement of said member in one direction, and means acting when rendered operative to vary the timing of said reciprocatory and shoe engaging movements of said member to reverse the direction of feed.

5. A machine for operating upon shoes having, in combination, devices for operating upon the margin of a shoe arranged during the transfer of the point of operation about the shoe in one direction to perform one operation, and thereafter during the transfer of the point of operation about the shoe in an opposite direction to perform a second operation on the shoe, a shoe supporting jack, means for actuating the jack to transfer the point of operation about the shoe, and thereafter to cause the point of operation to be transferred about the shoe a second time in a reverse direction, a shoe engaging feeding member, means for reciprocating said feeding member in the line of feed, means acting in timed relation to said reciprocatory movements to engage said member with the shoe to feed the shoe, and means acting simultaneously with the reversal in the direction of movement of the jack to vary the relative timing of said reciprocatory and shoe engaging movements of the feeding member to reverse the direction of feed.

6. A machine for operating upon shoes having, in combination, an inseam trimming knife, a crease guide, a beater member arranged to operate against the crease guide to pound the welt, and a channel guide comprising a member oscillating in the line of feed to feed the shoe.

7. A machine for operating upon shoes having, in combination, an inseam trimming knife, a crease guide, a channel guide comprising a channel engaging member, and means for imparting an oscillatory movement to said channel engaging member to feed the work.

8. A machine for operating upon shoes having, in combination, an inseam trimming knife, a crease guide, a channel guide, a shoe supporting jack, means for actuating the jack to transfer the point of operation about the shoe, and means for imparting reciprocating movements to the channel guide to feed the shoe.

9. A machine for operating upon shoes having, in combination, an inseam trimming knife, a crease guide, a channel guide, a shoe supporting jack, means for actuating the jack to transfer the point of operation about the shoe and thereafter to cause the point of operation to be transferred about the shoe, a second time in a reverse direction, and means for imparting reciprocating movements to the channel guide to feed the shoe arranged to reverse the direction of feed simultaneously with the reversal of the direction of movement of the jack.

10. A machine for operating upon shoes having, in combination, an inseam trimming knife, a crease guide, a beater member arranged to operate against the crease guide to pound the welt, a channel guide, means for moving the beater member back and forth in the line of feed in timed relation to the beating stroke to feed the shoe, and means for imparting movements to the channel guide alternating with said feeding movements of the beater member to impart a continuous feeding movement to the shoe.

11. A machine for operating upon shoes having, in combination, an inseam trimming knife, a crease guide, a beater member arranged to operate against the crease guide to pound the welt, a channel guide, and means for imparting back and forth movements in the line of feed to the beater member in timed relation to the beating stroke and to the channel guide to impart a continuous feeding movement to the shoe.

12. A machine for operating upon shoes having, in combination, an inseam trimming knife, a crease guide, a beater member arranged to operate against the crease guide to pound the welt, a channel guide, a shoe supporting jack, means for actuating the jack to transfer the point of operation about the shoe, and means for imparting movements to the beater member and to the channel guide in timed relation to the beating stroke to impart a continuous feeding movement to the shoe.

13. A machine for operating upon shoes having, in combination, an inseam trimming knife, a crease guide, a beater member arranged to operate against the crease guide to pound the welt, a shoe supporting jack, means for actuating the jack to transfer the point of operation about the shoe and thereafter to cause the point of operation to be transferred about the shoe a second time in a reverse direction, and means for imparting movements to the beater member in timed relation to the beater stroke to feed the shoe arranged to reverse the direction of feed simultaneously with the reversal of the direction of movement of the jack.

14. A machine for operating upon shoes having, in combination, an inseam trimming knife, a crease guide, a beater member, means for imparting movements to said beater member toward and away from the crease guide to pound the welt, means for imparting movements to the crease guide and beater member back and forth in the line of feed in timed relation to the pounding stroke of the beater member to feed the work, and means acting when rendered operative to vary the timing of said back and forth movements with relation to the pounding stroke of the beater member to reverse the direction of feed.

15. A machine for operating upon shoes having, in combination, an inseam trimming knife, a channel guide, a crease guide, a beater member, means for imparting movements to the beater member toward and away from the crease guide to pound the welt, means for imparting movements to the channel guide and to the crease guide and beater member back and forth in the line of feed in timed relation to the pounding stroke of the beater member to impart a continuous feeding movement to the work, and means acting when rendered operative to vary the timing of said back and forth movements of the channel guide and the crease guide and beater member with relation to the pounding stroke of the beater member to reverse the direction of feed.

16. A machine for operating upon shoes having, in combination, a cam shaft, devices controlled from said cam shaft for operating upon the margin of a shoe, a feeding member movable back and forth in the line of feed arranged to engage with and feed the shoe, mechanism actuated from the cam shaft for imparting said back and forth movements to the feeding member, and power operated means acting on said mechanism automatically at predetermined times during the operation about predetermined portions of the shoe sole to vary the length of said back and forth movements to vary the rate of feed.

17. A machine for operating upon shoes having, in combination, a cam shaft, devices controlled from said cam shaft for operating upon the margin of a shoe, a feeding member movable back and forth in the line of feed arranged to engage with and feed the shoe, connections for actuating said feeding member from the cam shaft adjustable to vary the length of said back and forth movements, and power operated means acting automatically at predetermined times during the operation about the shoe to adjust said connections to vary the rate of feed during the transfer of the point of operation about predetermined portions of the shoe sole.

18. A machine for operating upon shoes having, in combination, a cam shaft, devices controlled from said cam shaft for operating upon the margin of a shoe, a feeding member arranged to engage with and feed the shoe, and connections for imparting movements to the feeding member from said cam shaft including a frame arranged to oscillate about a fixed axis, a link connected for lengthwise movement to actuate said feeding member, and a connection between one end of said link and said oscillatory frame adjustable in a path laterally of said axis to vary the amplitude of movement of said feeding member, and power operated means acting automatically at predetermined times during the operation on a shoe for adjusting said connection to vary the rate of feed.

19. A machine for operating upon shoes having, in combination, a cam shaft, devices controlled from said cam shaft for operating upon the margin of a shoe, a feeding member arranged to engage with and feed the shoe, and connections for imparting movements to the feeding member from said cam shaft including a frame arranged to oscillate about a fixed axis, a link connected for lengthwise movement to actuate said feeding member, and a connection between one end of said link and said oscillatory frame adjustable in an arcuate path having a radius equal to the length of said link and extending laterally through the axis of said oscillatory frame to vary the amplitude of movement of said feeding member, and means acting automatically during the operation on a shoe for adjusting said connection to one side or the other of said axis to reverse the direction of feed.

20. A machine for operating upon shoes having, in combination, an inseam trimming knife, a crease guide, a beater member, means for imparting movements to said beater member toward and away from the crease guide to pound the welt, a shoe supporting jack, means for actuating the jack to transfer the point of operation about the shoe and thereafter to cause the point of operation to be transferred about the shoe a second time in a reverse direction, means for imparting movements to the crease guide back and forth in the line of feed in timed relation to the pounding stroke of the beater member, connections actuated by said crease guide to impart a corresponding movement to the beater member therewith to feed the shoe, means arranged upon reversal of the direction of movement of the jack to vary said back and forth movements of the crease guide to reverse the direction of feed, and means for controlling the position of the beater member to pound the welt during movement of the jack in one direction, and to pound the inseam during the movement of the jack in the opposite direction.

21. A machine for operating upon shoes having, in combination, an inseam trimming knife, a crease guide, a beater member, means for imparting movement to the beater member toward and away from the crease guide to pound the shoe, means for imparting movement to the crease guide back and forth in the line of feed in timed relation to the pounding stroke of the beater member, means for varying the timing of the back and forth movement of the crease guide to reverse the direction of feed, and means for controlling the position of the beater member to pound the welt during the feed of the shoe in one direction and to pound the inseam during the feed of the shoe in the opposite direction.

22. A machine for operating upon shoes having, in combination, an inseam trimming knife, a crease guide, a beater member movable with relation thereto to pound the shoe, means for reciprocating the crease guide and beater member in the line of feed in timed relation to said pounding action to impart a feeding movement to the shoe, and means acting when rendered operative during an operation on a shoe to vary the effective feeding movements of said elements to vary the rate of feed.

23. A machine for operating upon shoes having, in combination, an inseam trimming knife, a crease guide, a beater member movable with relation thereto to pound the shoe, means for reciprocating the crease guide and beater member in the line of feed in timed relation to said pounding action to impart a feeding movement to the shoe, and means acting automatically at predetermined points in the operation on a shoe to vary the effective feeding movements of said elements to vary the rate of feed.

24. A machine for operating on shoes having, in combination, an inseam trimming knife, a channel guide, a crease guide, a beater member movable with relation to the crease guide to pound the shoe, means for reciprocating the crease guide and beater member in the line of feed in timed relation to said pounding action and for reciprocating the channel guide to impart a continuous feeding movement to the work, and means acting when rendered operative during an operation on a shoe to vary the effective feeding movements of said elements to vary the rate of feed.

25. A machine for operating on shoes having, in combination, an inseam trimming knife, a crease guide, a beater member movable with relation to the crease guide to pound the shoe, means for reciprocating the crease guide and beater member in the line of feed in timed relation to said pounding action to impart a feeding movement to the shoe, and means acting when rendered operative during an operation on a shoe to vary the amplitude of said reciprocating movements to vary the rate of feed.

26. A machine for operating on shoes having, in combination, an inseam trimming knife, a crease guide, a beater member movable with relation to the crease guide to pound the shoe, means for reciprocating the crease guide and beater member in the line of feed in timed relation to said pounding action to impart a feeding movement to the shoe, means for varying the timing of the reciprocatory movements of the crease guide and beater member to reverse the direction of feed, and means acting when rendered operative during the operation on the shoe for either direction of feed to vary the effective feeding movements of said elements to vary the rate of feed.

27. A machine for operating on shoes having, in combination, an inseam trimming knife, a crease guide, a beater member movable with relation to the crease guide to pound the shoe, a shoe supporting jack, means for actuating the jack to transfer the point of operation about the shoe arranged to vary the rate of transfer of the point of operation about designated portions of the shoe, means for imparting movements to the crease guide and beater member back and forth in the line of feed in timed relation to said pounding action to impart a feeding movement to the shoe, and means acting in timed relation to said jack actuating means to correspondingly vary the effective feeding movements of the crease guide and beater member.

28. A machine for operating upon shoes having, in combination, in inseam trimming knife, a channel guide, a crease guide, a beater member movable with relation to the crease guide to pound the shoe, a shoe supporting jack, means for actuating the jack to transfer the point of operation about the shoe arranged to vary the rate of transfer of the point of operation about designated portions of the shoe, means for imparting movements to the channel guide and to the crease guide and beater member back and forth in the line of feed in timed relation to said pounding action to impart a continuous feeding movement to the shoe, and means acting in timed relation to said jack actuating means to vary the amplitude of said back and forth movements in accordance with the variations in the rate of movement of the jack.

29. A machine for operating upon shoes having, in combination, an inseam trimming knife, a crease guide, a beater member movable with relation to the crease guide to pound the shoe, a shoe supporting jack, means for actuating the jack to transfer the point of operation about the shoe and thereafter to cause the point of operation to be transferred about the shoe a second time in a reverse direction, said means being arranged to vary the rate of transfer of the point of operation about designated portions of the shoe in each direction, means for imparting movements to the crease guide and beater member back and forth in the line of feed in timed relation to said pounding action to feed the shoe, means acting simultaneously with the reversal of the direction of movement of the jack to vary the timing of the back and forth movements of the crease guide and beater member to reverse the direction of feed, and means for varying the amplitude of said back and forth movements in accordance with the rate of movement of the jack in each direction.

30. A machine for operating upon shoes having, in combination, an inseam trimming knife, a channel guide, a crease guide, a beater member movable with relation to the crease guide to pound the shoe, a shoe supporting jack, means for actuating the jack to transfer the point of operation about the shoe to trim the inseam and thereafter to cause the point of operation to be transferred about the shoe a second time in a reverse direction to beat out the trimmed inseam, and means acting during the rotation of the jack in one direction to force the jack yieldingly outwardly against the channel guide and during the movement of the jack in an opposite direction to force the jack yieldingly inwardly against the crease guide.

31. A machine for operating upon shoes having, in combination, devices for operating upon the margin of a shoe, a guiding member acting against the shoe when pressed inwardly to position the shoe with relation to said operating devices, a second guiding member acting against the shoe when pressed outwardly to position the shoe with relation to said operating devices, a shoe supporting jack, means for actuating the jack to transfer the point of operation about the shoe and thereafter to cause the point of operation to be transferred about the shoe a second time in a reverse direction, and means acting during the rotation of the jack in one direction to force the jack yieldingly outwardly against one of said guiding members and during the movement of the jack in the opposite direction to force the jack yieldingly inwardly against the other of said guiding members.

32. A machine for operating upon shoes having, in combination, devices for operating upon the margin of a shoe, a guiding member acting against the shoe when pressed inwardly to position the shoe with relation to said operating devices during the transfer of the point of operation about the shoe in one direction, and a second guiding member acting against the shoe when pressed outwardly during the transfer of the point of operation about the shoe in the reverse direction to position the shoe with relation to said operating devices.

33. A machine for operating upon shoes having, in combination, an inseam trimming knife, a channel guide, a crease guide, a beater member movable with relation to the crease guide to pound the shoe, said channel guide being arranged during the inseam trimming and welt beating operations to guide the shoe against an outward pressure of the shoe, and said crease guide being arranged during the inseam pounding operation to guide the shoe against an inward pressure of the shoe.

34. A machine for operating upon shoes having, in combination, an inseam trimming knife, a channel guide, a crease guide, a beater member movable relatively to the crease guide to pound the shoe, a shoe supporting jack, means for actuating the jack to transfer the point of operation about the shoe and thereafter to cause the point of operation to be transferred about the shoe a second time in a reverse direction, and means acting during the movement of the jack in one direction to force the jack yieldingly outwardly against the channel guide and during the movement of the jack in an opposite direction to force the jack yieldingly inwardly against the crease guide.

35. A machine for operating upon shoes having, in combination, an inseam trimming knife, a channel guide, a crease guide, a beater member movable relatively to the crease guide to pound the shoe, a shoe supporting jack, means for actuating the jack to transfer the point of operation about the shoe, and thereafter to cause the point of operation to be transferred about the shoe a second time in a reverse direction, and means rendered operative upon reversal in the direction of feed to move the channel guide away from the work.

36. A machine for operating upon shoes having, in combination, an inseam trimming knife, a channel guide, a crease guide, a beater member movable relatively to the crease guide to pound the shoe, a shoe supporting jack, means for actuating the jack to transfer the point of operation about the shoe for trimming the inseam and thereafter to cause the point of operation to be transferred about the shoe a second time in a reverse direction for beating out the trimmed inseam, means acting during the inseam trimming operation to force the jack yieldingly outwardly against the channel guide and during the beating out of the inseam to force the jack yieldingly inwardly against the crease guide, and means acting during the reverse movement of the jack to move the channel guide out of engagement with the work.

37. A machine for operating upon shoes having, in combination, an inseam trimming knife, a channel guide, a crease guide, a beater member movable with relation to the crease guide to pound the shoe, a shoe supporting jack, means for actuating the jack to transfer the point of operation about the shoe and thereafter to cause the point of operation to be transferred about the shoe a second time in a reverse direction, said means being arranged to vary the rate of transfer of the point of operation about designated portions of the shoe in each direction, means for imparting movements to the channel guide and to the crease guide and beater member in timed relation to the pounding action to impart a continuous feeding movement to the shoe, and mechanism including a cam and intervening connections arranged to control the amplitude of the said feeding movements in accordance with the rate of movement of the jack and further arranged upon reversal of the direction of movement of the jack to vary the timing of said feeding movements with relation to the pounding stroke to reverse the direction of feed.

38. A machine for operating upon shoes, having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, and means acting automatically when rendered operative at the completion of said second transfer to unclamp the shoe.

39. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, and mechanism rendered operative upon movement of the jack out of operating position at the conclusion of said second transfer to unclamp the shoe.

40. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe, a spring tensioned by the rotation of the jack and acting when released to actuate said mechanism for unclamping the shoe.

41. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe including a shaft, means for locking the shaft to the jack, a spring connected to the shaft and tensioned by the rotation of the jack while the shaft is locked to the jack, and means for releasing the shaft from the jack to permit the spring to rotate the shaft and unclamp the shoe.

42. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe, a spring tensioned by the rotation of the jack, and means for releasing the spring upon the movement of the jack out of operating position.

43. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe including a shaft, means for locking the shaft to the jack, a spring connected to the shaft and tensioned by the rotation of the jack while the shaft is locked to the jack, and means for tripping the locking means during the movement of the jack out of operative position to permit the spring to rotate the shaft and unclamp the shoe.

44. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe including a shaft with relation to which the jack is rotatable, means for locking the shaft to the jack, a toggle, connections between the shaft and the toggle acting to straighten the toggle during the rotation of the jack in one direction while the shaft is released from the jack, a spring connected to the shaft and tensioned by the rotation of the jack in the other direction while the shaft is locked to the jack, and means for releasing the shaft from the jack to permit the spring to rotate the shaft and actuate the straightened toggle to unclamp the shoe.

45. A machine for operating upon shoes having, in combination, means for operating along the bottom margin of a shoe, a shoe supporting jack comprising means for clamping the shoe in position on the jack, means for imparting longitudinal and rotating movements to the jack to transfer the point of operation about the shoe and thereafter to cause the point of operation to be transferred about the shoe a second time in a reverse direction, mechanism mounted in the jack for unclamping the shoe including a shaft with relation to which the jack is rotatable, means for locking the shaft to the jack, connections between the shaft and the clamping means adjusted for operation by the rotation of the jack in one direction while the shaft is released from the jack, a spring connected to the shaft and tensioned by the rotation of the jack in the other direction while the shaft is locked to the jack, and means for releasing the shaft from the jack to permit the spring to rotate the shaft and actuate said adjusted connections to unclamp the shoe.

GARRETT P. S. CROSS.